(12) United States Patent
Mori

(10) Patent No.: US 6,832,782 B2
(45) Date of Patent: Dec. 21, 2004

(54) PRETENSIONER DEVICE AND SEAT BELT DEVICE

(75) Inventor: Shinji Mori, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 88 days.

(21) Appl. No.: 10/294,767

(22) Filed: Nov. 15, 2002

(65) Prior Publication Data

US 2003/0094805 A1 May 22, 2003

(30) Foreign Application Priority Data

Nov. 19, 2001 (JP) ......................................... 2001-353000

(51) Int. Cl.⁷ ............................................. B60R 22/36
(52) U.S. Cl. ....................................... 280/806; 242/374
(58) Field of Search ............................... 280/806–808; 242/372, 374; 297/470, 474–479

(56) References Cited

U.S. PATENT DOCUMENTS

| | | | | |
|---|---|---|---|---|
| 4,135,683 A | * | 1/1979 | Stephenson et al. | 242/378.4 |
| 4,147,387 A | * | 4/1979 | Coenan | 297/475 |
| 4,164,336 A | * | 8/1979 | Higbee et al. | 242/378.4 |
| 4,303,209 A | * | 12/1981 | Stephenson | 242/372 |
| 4,307,853 A | * | 12/1981 | Higbee et al. | 242/385.2 |
| 4,327,882 A | * | 5/1982 | Frankila et al. | 242/378.4 |
| 4,394,993 A | * | 7/1983 | Stamboulian et al. | 242/378.4 |
| 4,896,844 A | * | 1/1990 | Gavagan et al. | 280/807 |
| 5,393,091 A | * | 2/1995 | Tanaka et al. | 280/733 |
| 6,053,532 A |   | 4/2000 | Wilkins et al. | |
| 6,533,315 B2 | * | 3/2003 | Brown et al. | 280/733 |

* cited by examiner

Primary Examiner—Paul N. Dickson
Assistant Examiner—Laura B. Rosenberg
(74) Attorney, Agent, or Firm—Nixon Peabody, LLP

(57) ABSTRACT

A seat belt device of the present invention has a retractor and a lap pretensioner which are assembled into a common frame. The retractor has a shoulder pretensioner mechanism which, when a vehicle rapidly decelerates, forcibly rotates a take-up shaft so as to retract a webbing for restraining a vehicle occupant. The pretensioner is a device which, when the vehicle rapidly decelerates, forcibly rotates a spool so as to retract a narrow width webbing connected to the webbing for restraining a vehicle occupant. The lap pretensioner contributes to the mountability to a vehicle of the overall seat belt device equipped with the pretensioner. The narrow width webbing, which is narrower than the webbing for restraining a vehicle occupant, is made more compact and can be retracted.

18 Claims, 14 Drawing Sheets

PRETENSIONER DEVICE AND SEAT BELT DEVICE

BACKGROUND OF THE INVENTION

1. Field of the Invention

The present invention relates to a pretensioner device which is used in a seat belt device for a vehicle, and which, at the time of a rapid deceleration of a vehicle such as a collision or the like, tenses a webbing for restraining a vehicle occupant, in the direction of restraining the vehicle occupant.

The present invention also relates to a three-point seat belt device equipped with the pretensioner device.

2. Description of the Related Art

Among seat belt devices for vehicles, there are three-point seat belt devices using a continuous webbing.

In this type of seat belt device, one end portion of the webbing is anchored to a take-up device (retractor), the intermediate portion of the webbing passes through a through-anchor fixed to the upper portion of the center pillar, and the other end portion of the webbing is anchored on an anchor plate. A tongue plate is disposed at the intermediate portion of the webbing between the anchor plate and the through-anchor. By anchoring the tongue plate in a buckle device disposed at the side of a seat, the webbing is pulled out from the retractor and applied to the vehicle occupant.

In this state, the shoulder webbing, which is from the through-anchor to the tongue plate (the buckle device), restrains the upper body of the vehicle occupant, whereas the lap webbing, which is from the tongue plate to the anchor plate, restrains the waist portion of the vehicle occupant.

Among such seat belt devices, there are those which are provided with a pretensioner device for tensing, in the direction of restraining the vehicle occupant, the webbing at the time of a rapid deceleration of the vehicle, such as at the time of a collision or the like. The seat belt device has a shoulder pretensioner device which is generally provided at the retractor and which rotates the take-up shaft of the retractor in a webbing take-up direction at the time of a rapid deceleration of the vehicle, so as to tense the webbing. Moreover, structures are known which, in order to improve the vehicle occupant restraining performance at the time of a rapid deceleration of the vehicle, have, in addition to the shoulder pretensioner device, a lap pretensioner device which pulls the buckle device or the anchor plate in toward the vehicle body so as to tense the webbing.

A structure equipped with a piston which is connected to the buckle device or the like via a wire; a cylinder; a base cartridge; and a gas generating means which is provided at the base cartridge and can supply gas to the cylinder, is known as a lap pretensioner device. The cylinder is cylindrical. The piston is disposed at one end side of the cylinder, and is accommodated within the cylinder so as to be movable toward the other end side of the cylinder. The base cartridge is a member which is connected to the one end side of the cylinder and bends back the intermediate portion of the wire toward the cylinder, and the bent-back intermediate portion of the wire is inserted through the base cartridge.

In this way, when the gas generating means is operated at the time of a rapid deceleration of the vehicle, gas is supplied to the interior of the cylinder. Due to the pressure of the supplied gas, the piston moves within the cylinder along the axial direction thereof toward the other end side, and the buckle device is pulled in toward the vehicle body.

However, in such a lap pretensioner device, because the piston moves rectilinearly within the cylinder and pulls in the wire, there is the problem that the outer shape of the lap pretensioner device (the space for mounting the lap pretensioner device in the vehicle) is large and the mountability of the lap pretensioner device into the vehicle is poor. Moreover, the lap pretensioner device must be mounted to the vehicle body separately from the retractor. The mountability of the overall seat belt device into the vehicle is poor, which results in higher costs.

Moreover, a lap pretensioner device, which has the above-described structure in which the buckle device or the anchor plate is pulled in, is mounted to the floor panel of the vehicle. Therefore, the need arises for special measures for improving the rigidity of the floor panel and the like, and there is the problem that this greatly affects the body structure (design). For example, reinforcing of the floor panel is a cause of preventing lightening of the weight of the vehicle.

SUMMARY OF THE INVENTION

In view of the aforementioned, an object of the present invention is to provide a pretensioner device which is compact and has improved mountability into a vehicle.

Another object of the present invention is to provide a seat belt device which is equipped with the above pretensioner device, and with which the space for mounting the seat belt device into a vehicle can be reduced while the ability thereof to restrain the vehicle occupant is maintained.

In order to achieve the above-described first object, a pretensioner device relating to a first aspect of the present invention is provided at another end portion of a webbing for restraining a vehicle occupant whose one end portion is anchored to a retractor so as to be freely taken-up and pulled-out, and the pretensioner device tenses the webbing for restraining a vehicle occupant in a direction of restraining a vehicle occupant at a time of rapid deceleration of a vehicle. The pretensioner device comprises: a webbing for tensing which is connected to the other end portion of the webbing for restraining a vehicle occupant and whose width is narrower than a width of the webbing for restraining a vehicle occupant; a spool at which a free end portion of the webbing for tensing is anchored, and which rotates and can take-up the webbing for tensing; and a driving device rotating the spool in a direction of taking-up the webbing for tensing at a time of rapid deceleration of the vehicle.

In the pretensioner device of the present invention, the free end portion of the webbing for tensing, which is connected to the other end portion of the webbing for restraining a vehicle occupant, is anchored on the spool. The other end portion of the webbing for restraining a vehicle occupant, which usually can be freely pulled-out and taken-up by the retractor, is fixed and held via the webbing for tensing.

Note that, in a structure in which the webbing for tensing is wound on the spool in an initial state, it is preferable to provide a restricting device which restricts rotation of the spool in the direction of pulling-out the webbing for tensing.

At the time of a rapid deceleration of the vehicle, the driving device operates, and the driving device rotates the spool in the direction of taking-up the webbing for tensing. The webbing for tensing is thereby taken up onto the spool, and tenses the webbing for restraining a vehicle occupant in the direction of restraining the vehicle occupant.

Here, because the pretensioner device tenses the webbing for restraining a vehicle occupant by taking-up the webbing for tensing, the longitudinal dimension of the pretensioner device is small as compared with a structure in which a wire connected to a piston is pulled in rectilinearly as in the conventional art. Further, because the webbing for tensing has a more narrow width than the width of the webbing for restraining a vehicle occupant, the widthwise dimension can be prevented from becoming large, and the pretensioner device can be made more compact on the whole.

Because the pretensioner device is structured to take-up the webbing for tensing which is connected to the other end portion of the webbing for restraining a vehicle occupant, there is no need to mount the pretensioner device to the floor panel of a vehicle. Accordingly, the range over which the pretensioner device can be mounted in a vehicle is broadened, and the mountability improves. Further, for example, if the pretensioner device is structured so as to be mounted to the lower portion of the center pillar together with the retractor, there are few effects on the body structure.

In this way, the pretensioner device of the present invention is compact, and the mountability thereof to a vehicle is improved.

There are cases in which the pretensioner device relating to the present invention has a base member which is formed in a block shape, and accommodates the spool further toward one side of the base member than a central portion in a widthwise direction of the base member such that a rotational axial direction of the spool and the widthwise direction of the base member coincide, and the driving device is assembled to another side of the base member in the widthwise direction.

In a pretensioner device having such a base member, the spool is accommodated (disposed) further toward one side than a central portion in the widthwise direction of the base member. In addition, the driving device is built into the side of the base member opposite the side at which the spool is provided. As a result, the driving device is positioned at one end side in the axial direction of the spool, and the pretensioner device can be made more compact on the whole.

In particular, in a structure in which the diameter of the spool is made to be large and the amount of rotation of the spool with respect to a predetermined take-up amount of the webbing for tensing (the change in the dimension in the radial direction of the spool before and after taking-up of the webbing for tensing) is kept low, it suffices for the range of operation of the driving device (the range over which the driving device rotates the spool) to be small (the dimension of the driving device with respect to the spool is relatively small). As a result, the pretensioner device can be made even more compact.

When the pretensioner device relating to the present invention has the above-described base member, there are cases in which the driving device has the following members: a pinion which is provided to be integrally rotatable with the spool, a cylinder whose longitudinal direction is provided parallel to a predetermined radial direction of the pinion, a piston slidably accommodated in the cylinder, a rack which is provided at the piston and which, when the piston slides in the cylinder, rotates the pinion in a direction of taking-up the webbing for tensing while meshing with the pinion, and a gas supplying device communicating with the cylinder and supplying gas to the cylinder at a time of rapid deceleration of the vehicle so as to make the piston slide. In addition, the cylinder, and a mounting hole which communicates with the cylinder and which is for mounting the gas supplying device, may be formed in the base member such that central lines in axial directions of the cylinder and the mounting hole are positioned in a plane which is orthogonal to an axial direction of the spool.

In such a pretensioner device, at the time of a rapid deceleration of the vehicle, the gas supplying device operates and supplies gas to the cylinder. The piston slides within the cylinder due to the gas pressure of the gas, and rotates the pinion in the direction of taking-up the webbing for tensing while the rack, which is provided at the piston, meshes with the pinion. In this way, the spool, which is integrally rotatable with the pinion, rotates and takes-up the webbing for tensing, and the webbing for restraining a vehicle occupant is tensed in the direction of restraining the vehicle occupant.

Here, the cylinder and the gas supplying device (mounting hole), which respectively form the driving device, are disposed so as to communicate with one another and such that the central lines in the axial directions thereof are positioned in a plane which is orthogonal to the axial direction of the spool. Therefore, the dimension of the driving device in the widthwise direction (the axial direction of the spool) is small. Namely, the entire pretensioner device can be made even more compact.

In particular, if the cylinder and the gas supplying device (mounting hole) are disposed in directions intersecting one another, the longitudinal dimension of the driving device also can be made smaller.

Further, when the cylinder and the mounting hole are formed in the base member, the number of parts can be reduced. In this way, the assemblability of the pretensioner device is improved and the cost thereof can be reduced.

In the pretensioner device of the present invention described until now, the base member may be mounted between a pair of leg pieces which are provided at a frame for fixing the retractor to the vehicle and which oppose one another so as to substantially correspond to the width of the webbing for restraining a vehicle occupant, such that the widthwise direction of the base member coincides with the direction in which the pair of leg pieces oppose one another.

In such a pretensioner device, due to the spool being able to take-up the webbing for tensing which has a narrower width than the webbing for restraining a vehicle occupant, the base member, which accommodates the spool and the driving device within the widthwise direction dimension of the base member, is mounted (fixed) between the pair of leg pieces of the frame which substantially correspond to the width of the webbing for restraining the vehicle occupant, such that the widthwise direction of the base member coincides with the direction in which the pair of leg pieces oppose one another.

In other words, the pretensioner device is assembled integrally with the retractor. In this way, it suffices to mount the pretensioner device integrally with the retractor to the vehicle, and the mountability of the pretensioner device to the vehicle improves.

In order to achieve the above second object, a seat belt device relating to a second aspect of the present invention is a three-point seat belt device for restraining a vehicle occupant, and comprises a retractor having a take-up shaft which is rotatably supported at a frame fixed to a vehicle body, and at which one end portion of a webbing for restraining a vehicle occupant is anchored, and on which the webbing for restraining a vehicle occupant can be taken-up and from which the webbing for restraining a vehicle occupant can be pulled out, and a pretensioner mechanism which rotates the take-up shaft in a webbing take-up direction at a time of rapid deceleration of a vehicle; and the above-described pretensioner device which is provided at another end portion of the webbing for restraining a vehicle occupant.

The seat belt device of the present invention is a three-point seat belt device in which one end portion of the webbing for restraining a vehicle occupant is anchored to the take-up shaft of the retractor, and the other end portion of the webbing is connected (fixed) to the pretensioner device of the first aspect. Thus, usually, the spool of the pretensioner device fixes and holds, via the webbing for tensing, the other end portion of the webbing for restraining a vehicle occupant which is freely pulled out and taken up by the take-up shaft of the retractor.

When the vehicle occupant is to apply the webbing to himself/herself, for example, in a seat belt device which is applied to the driver's seat of a vehicle, the vehicle occupant anchors, in the buckle device, the tongue plate disposed at the intermediate portion of the webbing which is trained around and folded over at a through-anchor at the upper portion of the center pillar of the vehicle. In this state, the portion of the webbing for restraining a vehicle occupant, which is from the through-anchor to the tongue plate (i.e., the shoulder webbing), restrains the upper body of the vehicle occupant. The portion of the webbing for restraining a vehicle occupant, which is from the tongue plate to the pretensioner device (i.e., to the webbing for tensing) (i.e., the lap webbing), restrains the waist portion of the vehicle occupant.

In a structure in which, in the initial state, the webbing for tensing is wound on the spool, or in a structure in which the retractor permits pulling-out of the webbing for restraining a vehicle occupant after the pretensioner mechanism is operated, it is preferable to provide a restricting device which restricts rotation of the spool in the direction of pulling-out the webbing for tensing.

When the vehicle rapidly decelerates, the pretensioner mechanism of the retractor and the pretensioner device (the driving device) are both operated. Thus, the pretensioner mechanism rotates the take-up shaft in the webbing take-up direction, and mainly the shoulder webbing is tensed in the direction of restraining the vehicle occupant. Further, the driving device of the pretensioner device rotates the spool in the direction of taking-up the webbing for tensing such that the webbing for tensing is taken up onto the spool, and mainly the lap webbing is tensed in the direction of restraining the vehicle occupant.

In this way, when the vehicle rapidly decelerates, the webbing for restraining a vehicle occupant is tensed from the both end sides thereof so as to appropriately limit the amount of movement of the vehicle occupant, and the vehicle occupant is properly protected. In other words, the ability to restrain the vehicle occupant is good.

Here, the seat belt device is provided with the pretensioner device which is compact as described above. Thus, the seat belt device can on the whole be made more compact, and the space for mounting the seat belt device into a vehicle can be reduced. Moreover, as described above, because there is no need to mount the pretensioner device to the floor panel of a vehicle, there are few effects on the body structure.

When the seat belt device is equipped with the pretensioner device in which the base member is mounted between the pair of leg pieces in accordance with the aforementioned condition, the retractor and the pretensioner device are assembled integrally. Therefore, the retractor and the pretensioner device can be integrally mounted to a vehicle. The mountability of the seat belt device to a vehicle is improved.

In this way, the seat belt device of the present invention is equipped with the above-described pretensioner device, and the space for mounting the seat belt device to a vehicle can be reduced while the ability of the seat belt device to restrain a vehicle occupant is maintained.

DESCRIPTION OF THE PREFERRED EMBODIMENTS

A lap pretensioner device 50 serving as a pretensioner device relating to an embodiment of the present invention, and a seat belt device 10 equipped with the lap pretensioner device 50, will be described on the basis of FIGS. 1 through 11. Note that, in the figures, for convenience, the direction denoted by arrow A is the webbing take-up direction, and the direction denoted by arrow B is the webbing pull-out direction.

Figure 4:
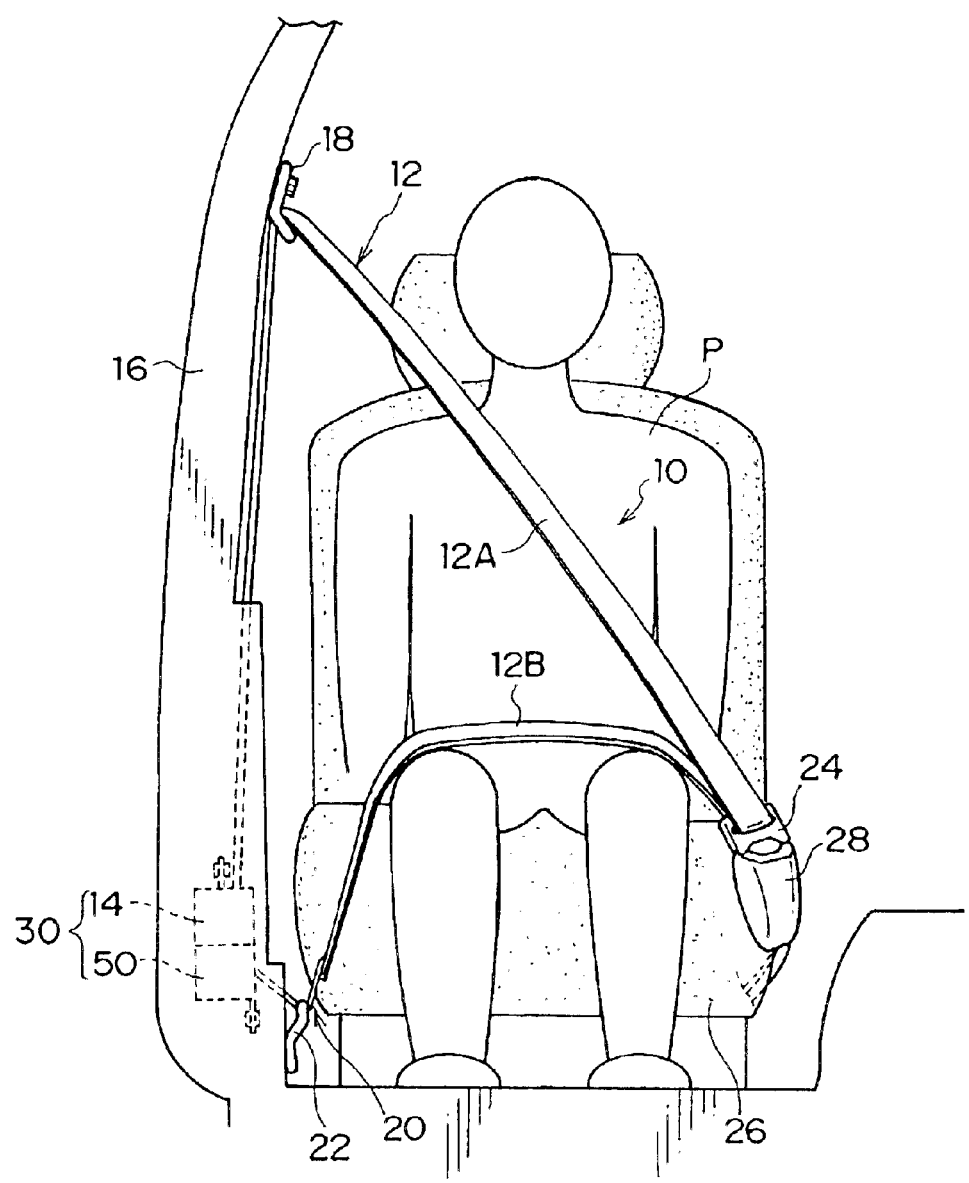
FIG. 4 is a schematic front view showing the overall structure of a seat belt device equipped with the lap pretensioner device relating to the embodiment of the present invention.

FIG. 4 is a perspective view of the overall structure of the seat belt device 10. As shown in FIG. 4, the seat belt device 10 is a three-point seat belt device, and is equipped with a webbing 12 for restraining a vehicle occupant. One end portion of the webbing 12 is anchored on a take-up shaft 14A of a retractor 14, so as to be freely taken-up thereon and pulled-out therefrom. The take-up shaft 14A is usually urged in the direction of rotating to take-up the webbing 12 (the direction of arrow A) by the urging force of a power spring (not illustrated).

The retractor 14 is assembled integrally with the lap pretensioner device 50, so as to form a shoulder/lap pretensioner integrated-type retractor 30. This structure will be described in detail later. The shoulder/lap pretensioner integrated-type retractor 30 is fixed to the lower portion of a center pillar 16 of the vehicle.

The intermediate portion of the webbing 12 is inserted through a through-anchor 18 disposed at the upper portion of the center pillar 16, and is folded back. A narrow width webbing 20, which serves as a webbing for tensing, is connected to the other end portion of the webbing 12. The narrow width webbing 20 is made to a have a narrow width which is substantially half of the width of the webbing 12 for restraining a vehicle occupant (e.g., the width of the narrow width webbing 20 is 24 mm with respect to a width of 46 mm of the webbing 12), and is made to be thicker than the webbing 12.

Figure 5A:
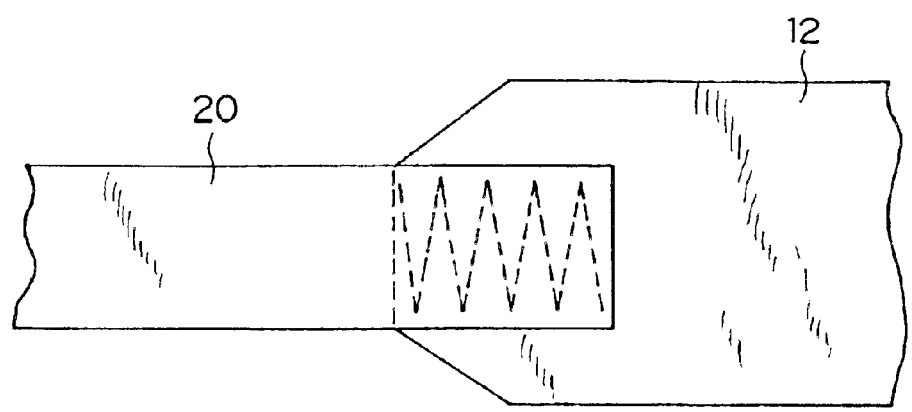
FIG. 5A is a plan view showing a portion of connection of a webbing for restraining a vehicle occupant and a narrow-width webbing which is taken-up by the lap pretensioner device relating to the embodiment of the present invention.
Figure 5B:
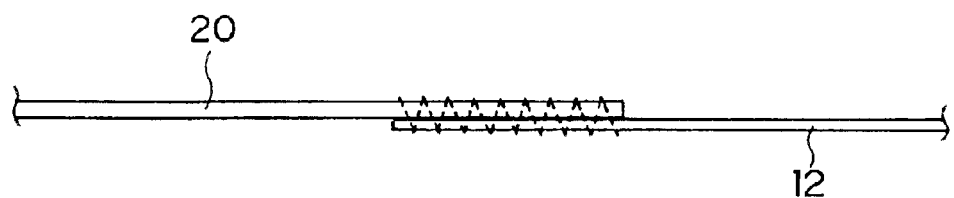
FIG. 5B is a side view corresponding to FIG. 5A.

As shown in FIGS. 5A and 5B, the webbing 12 and the narrow width webbing 20 are strongly connected together by, for example, sewing, in a state in which respective end portions of the webbing 12 and the narrow width webbing 20 are superposed on each other such that the longitudinal direction central lines thereof substantially coincide. The narrow width webbing 20 is inserted through a slip joint 22 fixed to the lower end portion of the center pillar 16, and is folded back. The distal end portion (free end portion) of the narrow width webbing 20 at the side opposite the side connected to the webbing 12 is anchored on a spool 78 of the lap pretensioner device 50.

As will be described later, only rotation of the spool 78 in the direction of taking-up the narrow width webbing 20 is permitted. The spool 78 is structured such that, in the state in which the lap pretensioner device 50 is not operated, the other end portion of the webbing 12 is fixed to the lap pretensioner device 50 via the narrow width webbing 20.

A tongue plate 24 is disposed such that the intermediate portion of the webbing 12 between the through-anchor 18 and the slip joint 22 (the end connected to the narrow width webbing 20) is inserted through the tongue plate 24. The tongue plate 24 can be anchored at a buckle device 28 disposed at the side of a vehicle seat 26, which side is opposite the side at which the slip joint 22 is provided.

In this way, when the webbing 12 is to be applied to a vehicle occupant, the vehicle occupant pulls the tongue plate 24 and pulls the webbing 12 out from the retractor 14 against the urging force of the power spring which is applied to the take-up shaft 14A. Then, the vehicle occupant anchors the tongue plate 24 at the buckle device 28.

Next, the shoulder/lap pretensioner integrated-type retractor 30, in which the retractor 14 and the lap pretensioner device 50 are assembled integrally, will be described. A perspective view illustrating the overall structure of the shoulder/lap pretensioner integrated-type retractor 30 is shown in FIG. 1, and a front view of the shoulder/lap pretensioner integrated-type retractor 30 is shown in FIG. 2.

Figure 1:
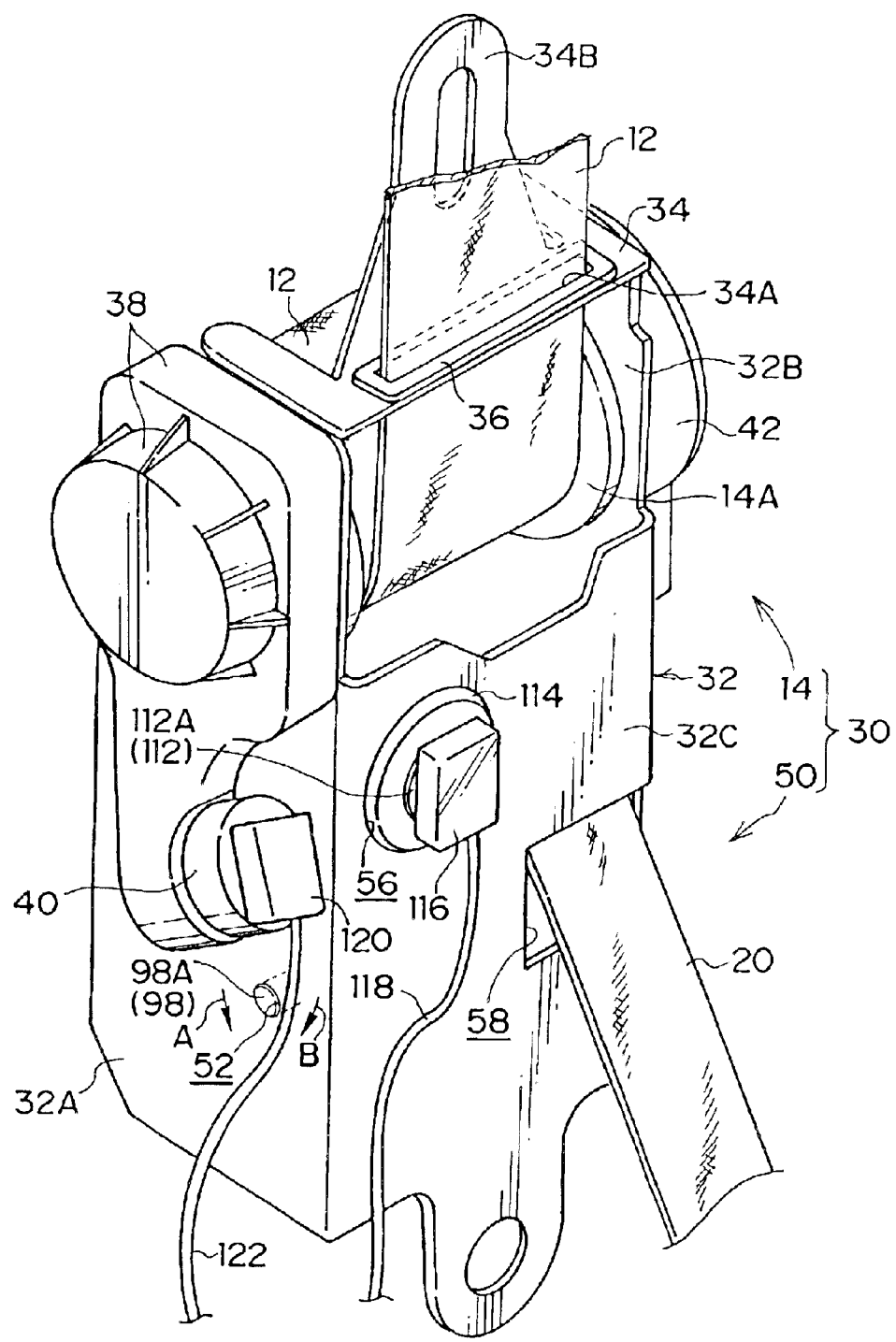
FIG. 1 is a perspective view showing the overall structure of a shoulder/lap pretensioner integrated-type retractor equipped with a lap pretensioner device relating to an embodiment of the present invention.
Figure 2:
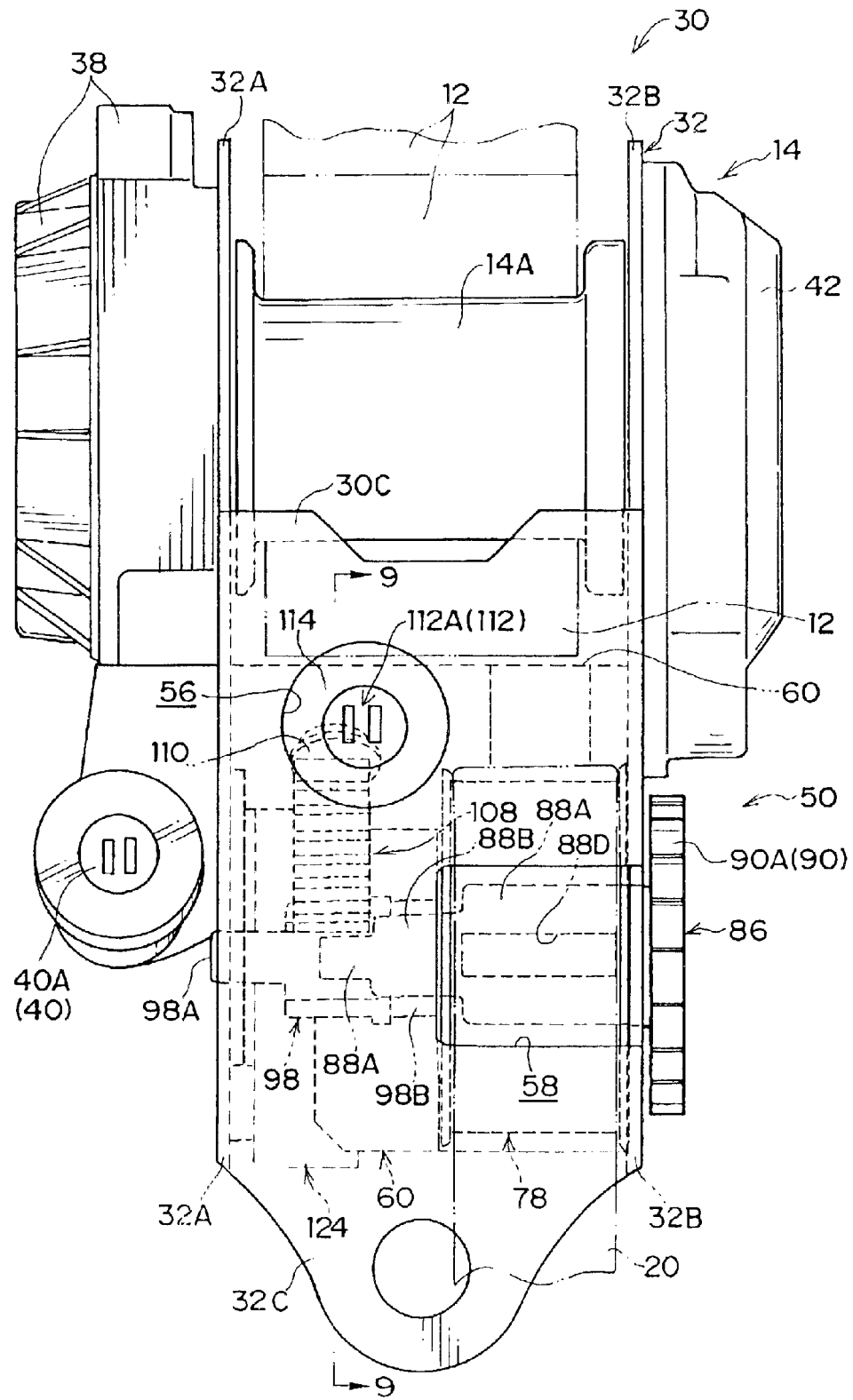
FIG. 2 is a front view of the shoulder/lap pretensioner integrated-type retractor equipped with the lap pretensioner device relating to the embodiment of the present invention.
Figure 6:
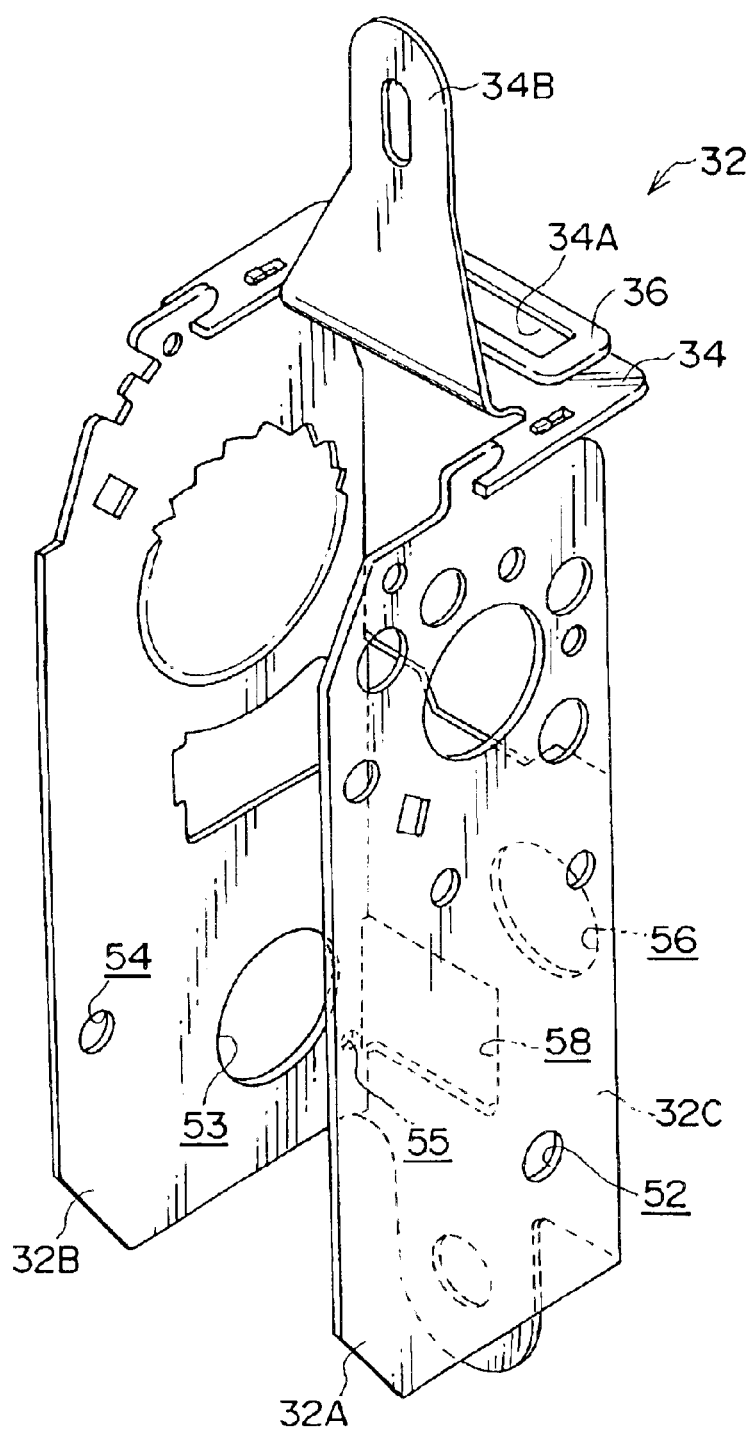
FIG. 6 is a perspective view of a frame forming the shoulder/lap pretensioner integrated-type retractor equipped with the lap pretensioner device relating to the embodiment of the present invention.

As shown in FIGS. 1 and 2, the shoulder/lap pretensioner integrated-type retractor 30 is equipped with a frame 32. As shown in FIG. 6, the frame 32 has a pair of leg pieces 32A, 32B which oppose one another, and a back piece 32C connected to the leg pieces 32A, 32B. The frame 32 forms a substantial U shape as seen in plan view. The back piece 32C extends downwardly, and the bottom end portion thereof is fixed to the vehicle body by a bolt.

A connecting piece 34 spans between the top edge portions of the leg pieces 32A, 32B of the frame 32. A guide hole 34A through which the webbing 12 is inserted, and a mounting portion 34B which is for fixing to the vehicle, are formed in the connecting piece 34. The guide hole 34A is a webbing guide of a retractor. A sliding member 36 formed of resin covers the inner edge portion of the guide hole 34A.

The take-up shaft 14A, whose axial direction is the direction in which the leg pieces 32A, 32B oppose one another, is provided at the upper portion between the leg pieces 32A, 32B of the frame 32 which oppose one another. One end of the webbing 12 for restraining a vehicle occupant is anchored on the take-up shaft 14A, and a portion of the webbing 12 is wound onto the take-up shaft 14A. Due to the take-up shaft 14A rotating, the webbing 12 can be freely taken up onto and pulled out from the take-up shaft 14A.

Covers 38 are mounted to the outer side of the upper portion of the leg piece 32A. An unillustrated shoulder pretensioner mechanism, and, for example, the power spring which urges the take-up shaft 14A in the webbing take-up direction, are accommodated at the inner sides of the covers 38.

At the time of a rapid deceleration of the vehicle such as a collision or the like, the shoulder pretensioner mechanism forcibly makes the take-up shaft 14A rotate in the webbing take-up direction. This mechanism is formed by, for example, a pinion provided coaxially with the take-up shaft 14A; a rack which can mesh with the pinion; a cylinder; and a gas generator 40. The cylinder is a member which is fixed to the leg piece 32A and slidably accommodates a piston provided at the end portion of the rack. The gas generator 40 is a member which serves as a gas supplying device which supplies gas to the cylinder at the time the vehicle rapidly decelerates (see FIGS. 2 and 3).

In this way, when the gas generator 40 is operated and gas is supplied to the interior of the cylinder, the rack meshes with the pinion while the piston slides within the cylinder. Then, the pinion, i.e., the take-up shaft 14A, is rotated in the direction of taking up the webbing 12.

A cover 42 is mounted to the outer side of the upper portion of the leg piece 32B. Accommodated at the inner side of the cover 42 are a portion of a mechanism (force limiter mechanism) which, at the time the vehicle rapidly decelerates, impedes rotation in the webbing pull-out direction of one end portion of a torsion bar which is inserted in the take-up shaft 14A, and a member called an acceleration sensor. The other end portion of the torsion bar is connected to the take-up shaft 14A so as to be integrally rotatable therewith. At the force limiter mechanism, when rotation of the one end portion of the torsion bar in the webbing pull-out direction is impeded, pulling-out of the webbing 12 is permitted while the torsion bar is twisted (i.e., while resisting the fixed torsional load of the torsion bar).

Namely, the retractor 14 is structured to include the upper portion of the frame 32, the take-up shaft 14A, the covers 38

(the shoulder pretensioner mechanism, the gas generator 40, and the like at the inner sides of the covers 38), and the cover 42 (the force limiter mechanism and the like at the inner side of the cover 42).

The lap pretensioner device 50 is disposed beneath the retractor 14 between the pair of leg pieces 32A, 32B of the frame 32. Thus, the frame 32 includes a pinion shaft hole 52 formed in the leg piece 32A, a gear shaft hole 53, a pawl shaft hole 54, and a spring receiving hole 55 all formed in the leg piece 32B, and a wiring hole 56 and a rectangular pull-out hole 58 both formed in the back piece 32C. The pull-put hole 58 is a seat belt guide or a webbing guide of a pretensioner device. The pinion shaft hole 52 and the gear shaft hole 53 are disposed to be coaxial to one another. The pull-out hole 58 is offset toward the leg piece 32B side with respect to the central line in the longitudinal direction of the webbing 12, and is formed by cutting out a portion of the leg piece 32B as well.

Figure 3:
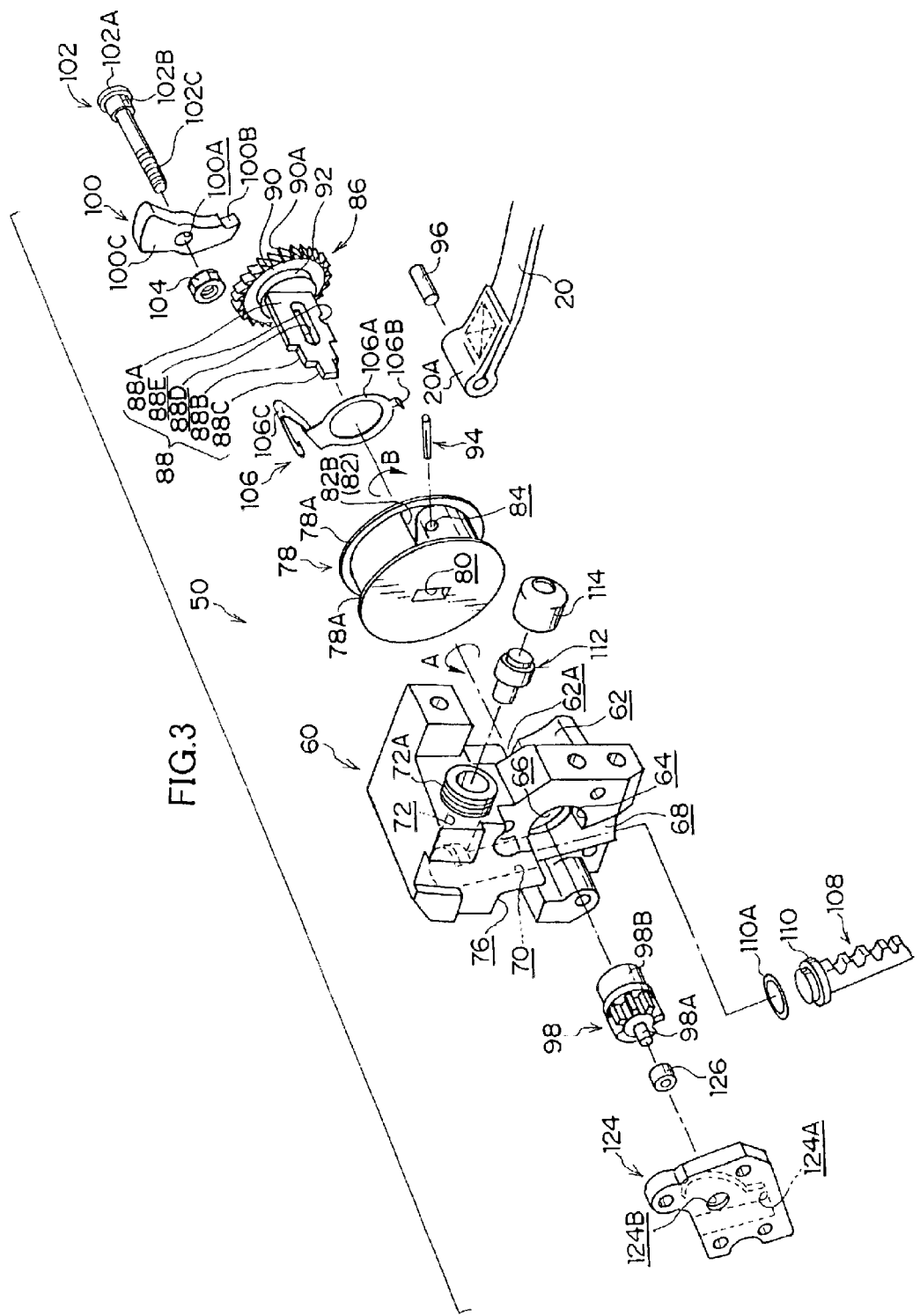
FIG. 3 is an exploded perspective view showing structural parts of the lap pretensioner device relating to the embodiment of the present invention.

As shown in the exploded perspective view of FIG. 3 from which the frame 32 is omitted, the lap pretensioner device 50 has a block-shaped base cartridge 60. The entire width of the base cartridge 60 corresponds to the interval between the leg pieces 32A, 32B of the frame 32. The base cartridge 60 is fixed to the frame 32 by screws or the like.

As illustrated in FIGS. 7 through 10, the following eight portions are formed in the base cartridge 60 by notches or holes for example. A spool accommodating portion 62 is formed from a substantially central portion in the widthwise direction to the leg piece 32B side end portion. A pinion accommodating portion 64 is formed at the end portion at the side opposite the spool accommodating portion 62. A connecting hole 66 communicates the spool accommodating portion 62 and the pinion accommodating portion 64. A rack path portion 68 is inclined with respect to the top-bottom direction of the base cartridge, and is continuous with the pinion accommodating portion 64. A cylinder hole 70 opens to the rack path portion 68 and is coaxial therewith. A gas generator mounting hole 72 is formed such that the longitudinal direction thereof is the depthwise direction of the base block 60, and communicates with the cylinder hole 70, and opens toward the rear piece 32C side. A pawl shaft hole 74 is provided along the widthwise direction of the base cartridge 60 in a vicinity of the end portion at the side opposite the rear piece 32C. A nut accommodating portion 76 is provided in a vicinity of the leg piece 32A side end portion of the pawl shaft hole 74. One portion of the gas generator mounting hole 72 projects toward the rear piece 32C, and a male screw 72A is formed at the outer surface of the hole wall thereof.

The lap pretensioner device 50 has a spool 78 for taking-up the narrow width webbing 20. The spool 78 is formed in the shape of a short, solid cylinder whose width substantially corresponds to the width of the narrow width webbing 20 and whose diameter is sufficiently larger (e.g., two or more times larger) than the width of the narrow width webbing 20. A flange 78A is formed at each end portion of the spool 78. The width of the spool 78 including the both flanges 78A is slightly smaller than the width of the spool accommodating portion 62 of the base cartridge 60.

Figure 11:
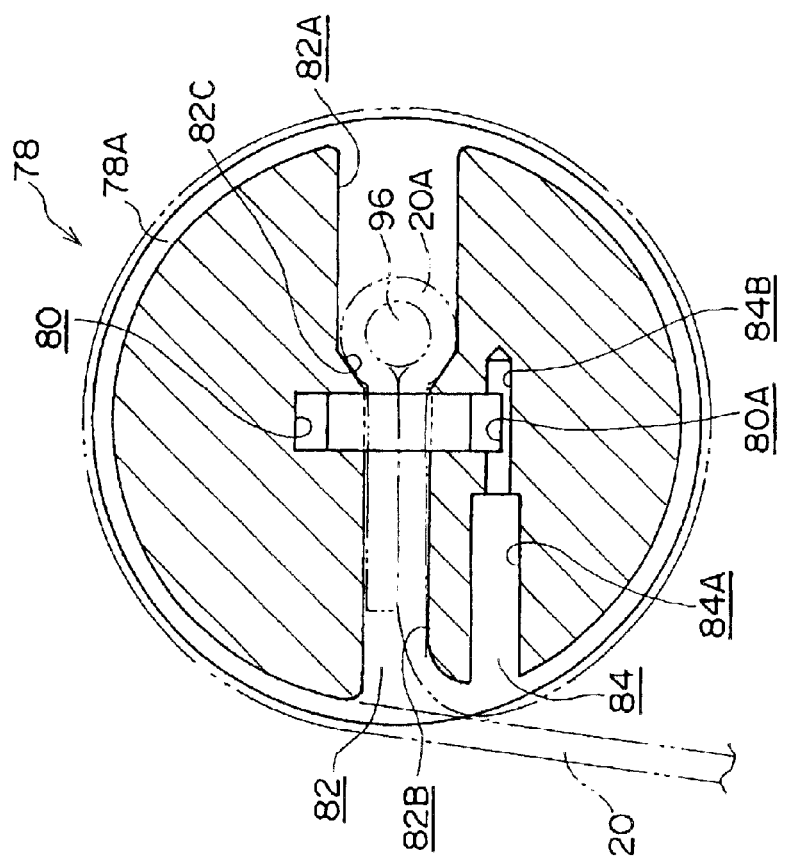
FIG. 11 is a sectional view taken orthogonally to the axial direction of a spool forming the lap pretensioner device relating to the embodiment of the present invention.

As shown in FIG. 11, a key hole 80, which penetrates through the axially central portion of the spool 78 in the axial direction, and an anchor hole 82, which penetrates through in the diameter direction, are formed in the spool 78. The key hole 80 is a long hole which is rectangular in cross-sectional view, and the longitudinal direction thereof runs along the radial direction of the spool 78 which is orthogonal to the axial direction of the anchor hole 82 (the aforementioned diameter direction). The key hole 80 is disposed so as to divide the anchor hole 82 at the intermediate portion thereof. Moreover, the longitudinal dimension of the leg piece 32A side end portion of the key hole 80 is slightly reduced.

The anchor hole 82 is a long hole which is rectangular in cross-sectional view, and which extends longitudinally along substantially the entire width of the spool 78 excluding the flanges 78A. One opening end side of the anchor hole 82 is a wide entrance portion 82A, and the other opening end thereof is a narrow exit portion 82B. In a vicinity of the portion where the entrance portion 82A communicates with the key hole 80, the entrance portion 82A continuously narrows to substantially the same width as the exit portion 82B, such that the inclined step portion forms an anchor portion 82C. The opening edge portion of the exit portion 82B at the side where the narrow width webbing 20 is trained around is substantially arc-shaped.

A pin hole 84 is provided parallel to the anchor hole 82, from the central portion in the widthwise direction of this arc-shaped opening edge portion. The pin hole 84 is circular as seen in cross-section. The region of the pin hole 84 until a vicinity of the key hole 80 is a large diameter portion 84A, and the intermediate portion of a small diameter portion 84B formed ahead of the large diameter portion 84A communicates with the key hole 80. Namely, a round groove portion 80A is formed by the pin hole 84 at the central portion in the axial direction of the key hole 80.

A key portion 88 (FIG. 7) of a gear member 86 is inserted through the key hole 80 of the spool 78 which is accommodated in the spool accommodating portion 62 of the base cartridge 60. The gear member 86 is structured by a gear portion 90, a supporting portion 92, and the key portion 88 being formed integrally. The gear portion 90 is provided at one end portion, and has an external ratchet gear 90A at the outer peripheral portion thereof. The supporting portion 92 is provided adjacent to and coaxial with the gear portion 90, and is supported so as to be freely rotatable at the gear shaft hole 53 of the frame 32. The key portion 88 stands erect in the axial direction from the supporting portion 92.

The key portion 88 has a first key portion 88A, a second key portion 88B, and a third key portion 88C. The first key-portion 88A is provided at the supporting portion 92 side, and the width of the first key portion 88A corresponds to the longitudinal dimension of the key hole 80. A semicircular cut-out portion 88E is provided in one end portion in the widthwise direction of the first key portion 88A. The second key portion 88B is provided at the distal end of the first key portion 88A, and has a smaller width than the first key portion 88A, and is a portion which is inserted into a connecting portion 98B of a pinion 98 which will be described later. The third key portion 88C is provided at the distal end of the second key portion 88B, and has a smaller width than the second key portion 88B, and is a portion which enters into the pinion 98. Moreover, an insert-through hole 88D, whose longitudinal dimension corresponds to the width of the narrow width webbing 20, is formed in the key portion 88.

The connecting of the gear member 86 and the spool 78 is carried out as follows. In the state in which the supporting portion 92 is inserted through the gear shaft hole 53 from the outer side of the leg piece 32B of the frame 32, the key portion 88 is inserted through the key hole 80. Then, the gear member 86 and the spool 78 are integrally and rotatably connected. There is a spring pin 94 which is inserted from the large diameter portion 84A of the pin hole 84 and which is held by spring force in the small diameter portion 84B. When the gear and the spool are connected, the spring pin 94 is positioned between the cut-out portion 88E and the round groove portion 80A of the key hole 80.

As described above, the gear member 86 is prevented from falling out of the spool 78. In this state, the gear portion 90 is disposed at the outer side of the leg piece 32B. Further, the anchor hole 82 of the spool 78 and the insert-through hole 88D of the gear member 86 communicate with one another in the state in which the axial directions thereof coincide.

The distal end portion of the narrow width webbing 20 before being connected to the webbing 12 is anchored at the anchor hole 82. The distal end portion of the narrow width webbing 20 is an annular portion 20A which is formed by the end portion of the narrow width webbing 20 being folded back and the narrow width webbing 20 being sewed in a vicinity thereof. A solid cylindrical stopper member 96 is fit into the annular portion 20A.

The narrow width webbing 20 is installed as follows. In the state in which the narrow width webbing 20 is not yet connected to the webbing 12, in the state in which the spool 78 is held such that a cut-out portion 62A (see FIG. 3) and the pull-out hole 58 of the frame 32 coincide with the anchor hole 82 and the insert-through hole 88D, the narrow width webbing 20 is inserted through from the entrance portion 82A of the anchor hole 82, with the end which is to be connected to the webbing 12 being the leading end thereof. Then, the annular portion 20A, which is maintained in an annular form by the stopper member 96, is engaged with the anchor portion 82C. The cut-out portion 62A is a member which is continuous with the interior of the spool accommodating portion 62 from the end portion of the base cartridge 60 at the side opposite the rear piece 32C.

In this way, one end portion of the narrow width webbing 20 is anchored at the spool 78. In the initial stage of operation, the narrow width webbing 20 is wound substantially one time over the circumference of the spool 78, and exits to the exterior (toward the slip joint 22 side) from the pull-out hole 58 of the frame 32. The length of bending back of the narrow width webbing 20 for forming the annular portion 20A is determined such that the bent-back end does not project out from the exit portion 82B of the anchor hole 82.

The pinion 98 is connected to the distal end portion of the gear member 86 which penetrates through the spool 78. The pinion 98 is formed so as to be able to mesh with a rack 108 which will be described later. A supporting shaft 98A, which is supported so as to be freely rotatable at the pinion shaft hole 52 of the frame 32, is formed at one end side of the pinion 98, and the connecting portion 98B is formed at the other end side of the pinion 98.

A key hole 98C, which corresponds to the second key portion 88B of the gear member 86, is formed in the connecting portion 98B. A key hole 98D, which corresponds to the third key portion 88C of the gear member 86, is provided at the connecting portion 98B from the bottom portion of the key hole 98C. The key hole 98D reaches to the inner side of the portion where the teeth of the pinion 98 are formed. The tooth width of the tooth of the pinion 98 which first abuts the rack 108 is larger (substantially two times larger) than the tooth widths of the other teeth.

The pinion 98 is disposed at the pinion accommodating portion 64 of the base cartridge 60. The connecting portion 98B of the pinion 98 is disposed in the connecting hole 66. In the state in which these members are disposed in this way, the second key portion 88B and the third key portion 88C of the gear member 86 are inserted into the key holes 98C, 98D of the pinion 98, respectively. In this way, the pinion 98 is connected to the spool 78 and the gear member 86 so as to be integrally rotatable therewith. Further, due to the supporting shaft 98A of the pinion 98 and the supporting portion 92 of the gear member 86 being shaft-supported at the pinion shaft hole 52 and the gear shaft hole 53 of the frame 32 respectively, the spool 78, the gear member 86 and the pinion 98 are supported at the frame 32 so as to be freely rotatable.

The lap pretensioner device 50 has a plate-shaped pawl 100. The pawl 100 is a member which meshes with the external ratchet gear 90A of the gear portion 90 (the gear member 86) positioned at the outer side of the frame 32 (the leg piece 32B).

The pawl 100 is formed in a substantial V shape, and a shaft hole 101A is provided at the central bent portion thereof. A lock tooth 100B, which can mesh with the external ratchet gear 90A of the gear portion 90, is formed at one end side of the pawl 100. A siring receiving portion 100C is formed at the portion of the pawl 100 which is further toward the other end side than the shaft hole 100A.

The pawl 100 is shaft-supported at a pawl supporting shaft 102. A head portion 102A, which has a larger diameter than the shaft hole 100A, is provided at one end portion of the pawl supporting shaft 102. Further, a supporting shaft portion 102B is provided at one end portion of the pawl supporting shaft 102. The supporting shaft portion 102B is adjacent to the head portion 102A, and corresponds to the shaft hole 100A of the pawl 100, and has a substantially larger diameter than the main body shaft portion. The longitudinal dimension of the shaft supporting portion 102B is slightly larger than the plate thickness of the pawl 100. A male screw 102C is formed at the other end portion of the pawl supporting shaft 102.

In the state in which the head portion 102A of the pawl supporting shaft 102 is engaged with the outer end surface of the pawl 100, the supporting shaft portion 102B is inserted into the shaft hole 100A of the pawl 100, and the main body shaft portion is inserted through the pawl shaft hole 54 of the frame 32 and the pawl shaft hole 74 of the base cartridge 60. In this state, by screwing a nut 104 together with the male screw 102C projecting at the nut accommodating portion 76 of the base cartridge 60, the pawl supporting shaft 102 is fixed (prevented from coming out). The pawl 100 is supported so as to be able to rotate freely around the shaft hole 100A, by the supporting shaft portion 102 which is longer than the plate thickness of the pawl 100.

The lap pretensioner device 50 has a return spring 106 which urges the pawl 100 in the direction of meshing with the gear portion 90 of the gear member 86. The return spring 106 is formed by a thin plate member formed of metal or the like, and is structured to include a holding portion 106A which is annular and through which the supporting portion 92 of the gear member 86 can be inserted, an engagement portion 106B which extends in the radial direction from the holding portion 106A and is folded over in the axial direction, and a plate spring portion 106C which extends in the direction of the holding portion 106A opposite to the direction in which the engagement portion 106B extends, and which is folded over in the axial direction and in the plate thickness direction.

In the state in which the return spring 106 is disposed at the outer side of the leg piece 32B of the frame 32 and the engagement portion 106B is engaged with (inserted in) the spring receiving hole 55 of the frame 32, the supporting portion 92 of the gear member 86 is inserted through the holding portion 106A. In this state, the plate spring portion 106C is positioned at the outer side in the radial direction of the gear portion 90, and urges the spring receiving portion 100C of the pawl 100 in the direction of arrow C in FIG. 8.

Figure 8:
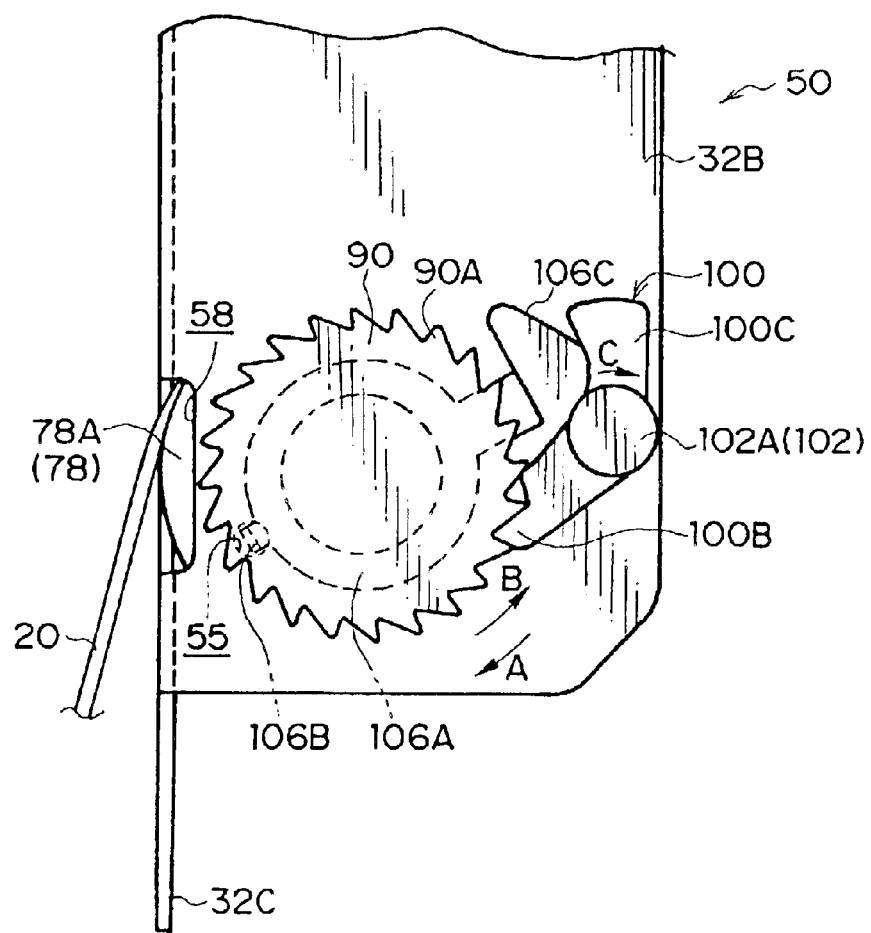
FIG. 8 is a side view showing a rotating direction restricting portion forming the lap pretensioner device relating to the embodiment of the present invention.

In this way, as shown in FIG. 8, the pawl 100 is urged in the direction in which the lock tooth 100B meshes with the external ratchet gear 90A formed at the gear portion 90 of the gear member 86. Rotation of the gear member 86 (i.e., the spool 78 which rotates integrally with the gear member 86) in the direction of pulling-out the narrow width webbing 20 (the direction of arrow B) is restricted, and rotation of the gear member 86 (i.e., the spool 78) in the direction of taking-up the narrow width webbing 20 (the direction of arrow A) is permitted.

The gear portion 90, the pawl 100, the pawl supporting shaft 102, and the return spring 106 form a restricting device which restricts rotation of the spool 78 in the direction of arrow B.

Figure 9A:
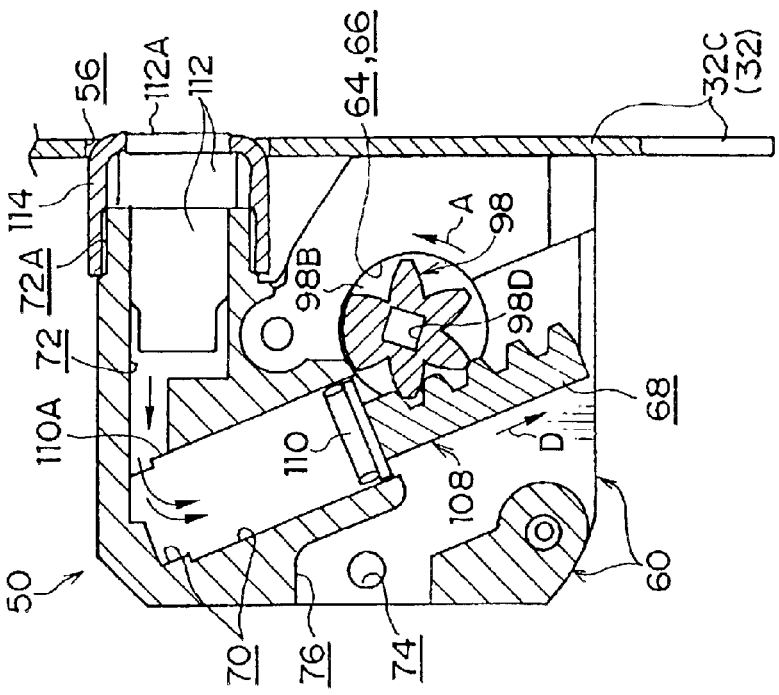
FIG. 9A is a sectional view, taken along line IX—IX of FIG. 2, showing a driving device of the lap pretensioner device relating to the embodiment of the present invention.
Figure 9B:
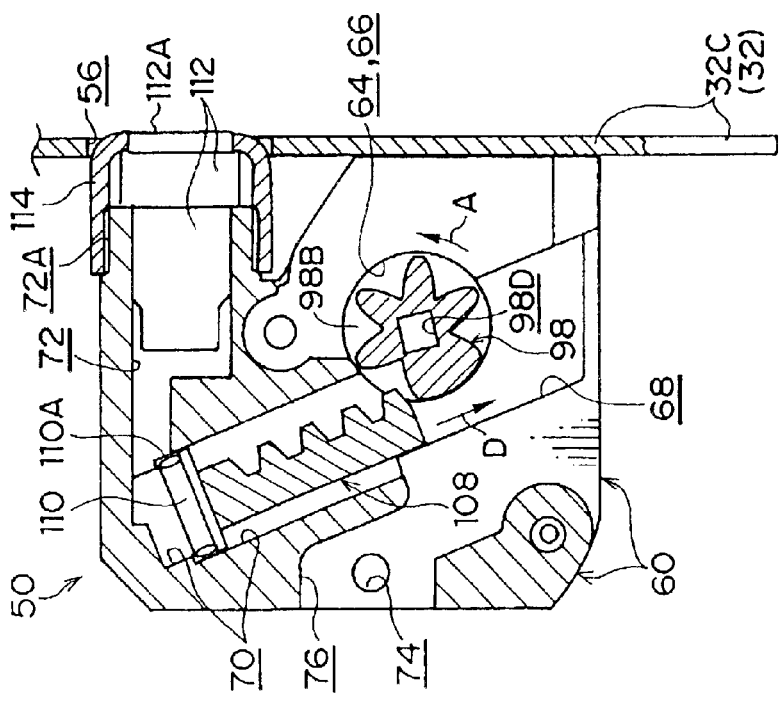
FIG. 9B is a sectional view showing a state of operation of the driving device shown in FIG. 9A.

As shown in FIGS. 9A and 9B, the rack 108 which can mesh with the pinion 98 is disposed in a vicinity of the pinion 98. The rack 108 has, at one end portion thereof, a piston 110 corresponding to the cylinder hole 70 of the base cartridge 60, and is inserted and disposed in the cylinder hole 70 from the piston 110 side thereof. In this state, the distal end portion of the rack 108 projects from the cylinder hole 70 into the rack path portion 68. Further, the region between the piston 110 and the cylinder hole 70 is sealed by an O-ring 110A provided at the piston 110.

The rack path portion 68 cuts-out substantially half of the pinion accommodating portion 64, and communicates therewith. When the rack 108 moves in the axial direction of the cylinder hole 70 (e.g., in the direction of arrow D in FIG. 9A), the rack 108 rotates the pinion 98 by a predetermined amount in the direction of arrow A while meshing with the pinion 98.

As shown in FIG. 9B, this predetermined amount is made to be substantially ⅔ of a rotation by setting the diameter of the spool 78 as described above. In this way, as described above, the tooth thickness of the tooth of the pinion 98 which first abuts the rack 108 can be made to be substantially twice that of the other teeth.

A gas generator 112 is mounted to the gas generator mounting hole 72 which communicates with the bottom portion of the cylinder hole 70. The gas generator 112 is an example of a member which serves as a gas supplying device. The cylinder hole 70 and the gas generator mounting hole 72 communicate with one another in a state in which the central lines in the longitudinal directions thereof coincide with one another in a plane which is orthogonal to the axial direction of the spool 78 disposed in the spool accommodating portion 62. The cylinder hole 70 and the gas generator mounting hole 72 are disposed such that the longitudinal directions thereof intersect one another (intersect one another at an acute angle in the present embodiment), and are disposed efficiently within the base cartridge 60 which is compact.

The gas generator 112 is strongly fixed to the base cartridge 60 by the large diameter portion of the gas generator 112 being nipped by the edge portion of the gas generator mounting hole 72 and a cap 114 which is screwed with the male screw 72A of the gas generator mounting hole 72.

The gas generator 112 accommodates, in the interior thereof, a gas generating agent which generates a large amount of gas upon combustion, and an ignition device which, when operated, ignites the gas generating agent. (Neither the gas generating agent nor the ignition device is illustrated.) A connector portion 112A (FIG. 2) which is disposed at the end surface of the gas generator 112 is exposed to the exterior from the wiring hole 56 of the frame 32. The ignition device of the gas generator 112 is electrically connected to a control device disposed at an appropriate position of the vehicle, via the connector portion 112A, a connector 116 and a wire 118 (FIG. 1).

The control device is also electrically connected to an unillustrated acceleration sensor. When the acceleration sensor detects an acceleration (deceleration) of a predetermined value or greater, the control device operates the ignition device of the gas generator 112. Then, when the ignition device operates and ignites the gas generating agent, the gas generating agent burns and supplies a large amount of gas to the cylinder hole 70. The piston 110 (the rack 108) moves in the direction of arrow D due to the gas pressure of this gas.

The control device is also electrically connected to a connector portion 40A of the gas generator 40 forming the shoulder pretensioner mechanism of the retractor 14, via a connector 120 and a wire 122. In the same way as the gas generator 112, the gas generator 40 as well houses a gas generating agent and an ignition device. When the acceleration sensor detects an acceleration of a predetermined value or more, the control device also operates the ignition device of the gas generator 40. The shoulder pretensioner mechanism of the retractor 14, at which the gas generator 40 is operated, rotates the take-up shaft 14A in the direction of taking-up the webbing 12 as described previously.

The above-described pinion 98 which is integrally rotatably connected to the spool 78, the rack 108 which meshes with the pinion 98, the piston 110 provided at the rack 108, the cylinder hole 70 of the base cartridge 60 which slidably accommodates the piston 110, and the gas generator 112 (the gas generator mounting hole 72) which supplies gas to the cylinder hole 70, correspond to the "driving device" of the present invention.

Figure 10:
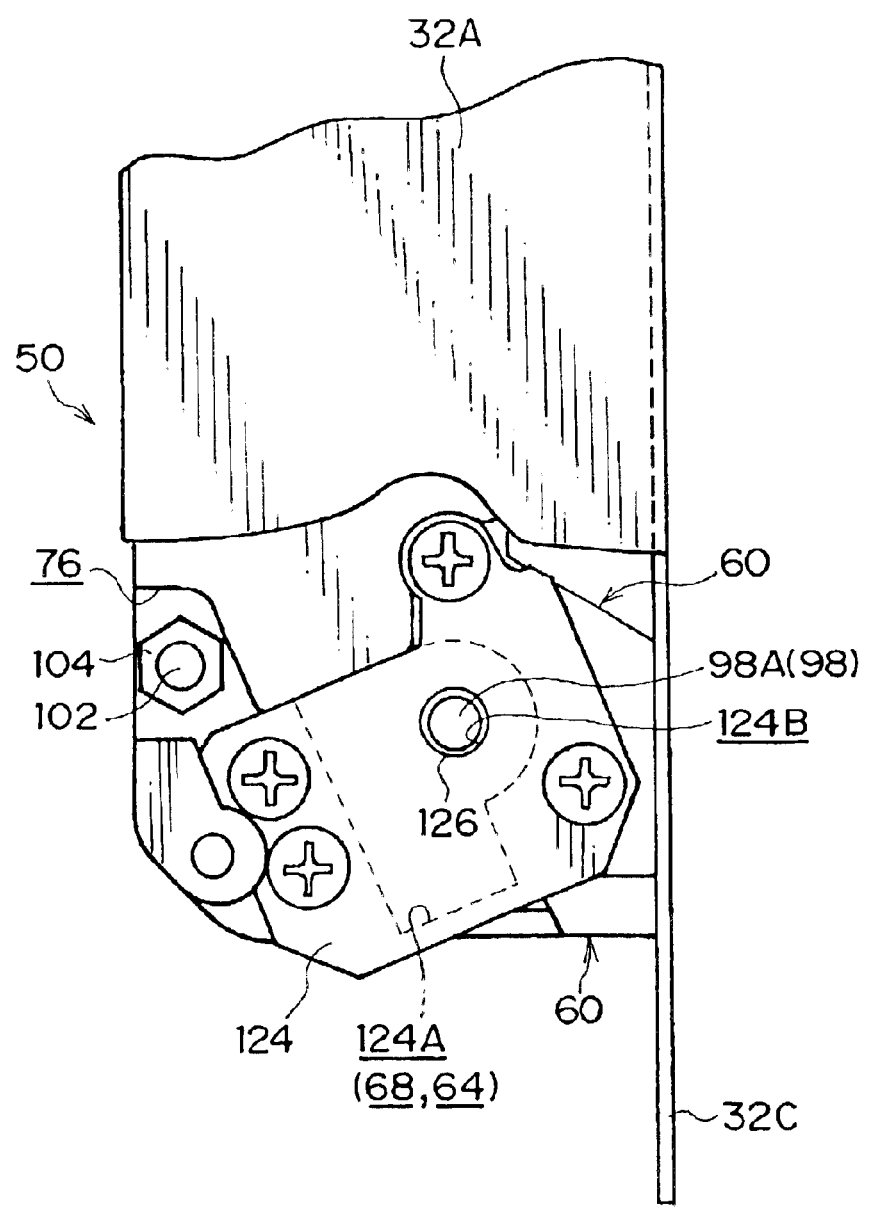
FIG. 10 is a side view, a portion of which has been removed, showing an assembled state of a cover plate forming the lap pretensioner device relating to the embodiment of the present invention.

The lap pretensioner device 50 has a cover plate 124 which covers the pinion accommodating portion 64 and the rack path portion 68 of the base cartridge 60. As shown in FIG. 10, the cover plate 124 has a concave portion 124A which substantially corresponds to the configurations of the side surfaces of the pinion accommodating portion 64 and the rack path portion 68 of the base cartridge 60 which are continuous with one another. A through hole 124B is formed in the concave portion 124A at a position corresponding to the supporting shaft 98A of the pinion 98. A bush 126 made of resin is fit into and attached to the through hole 124B.

Figure 7:
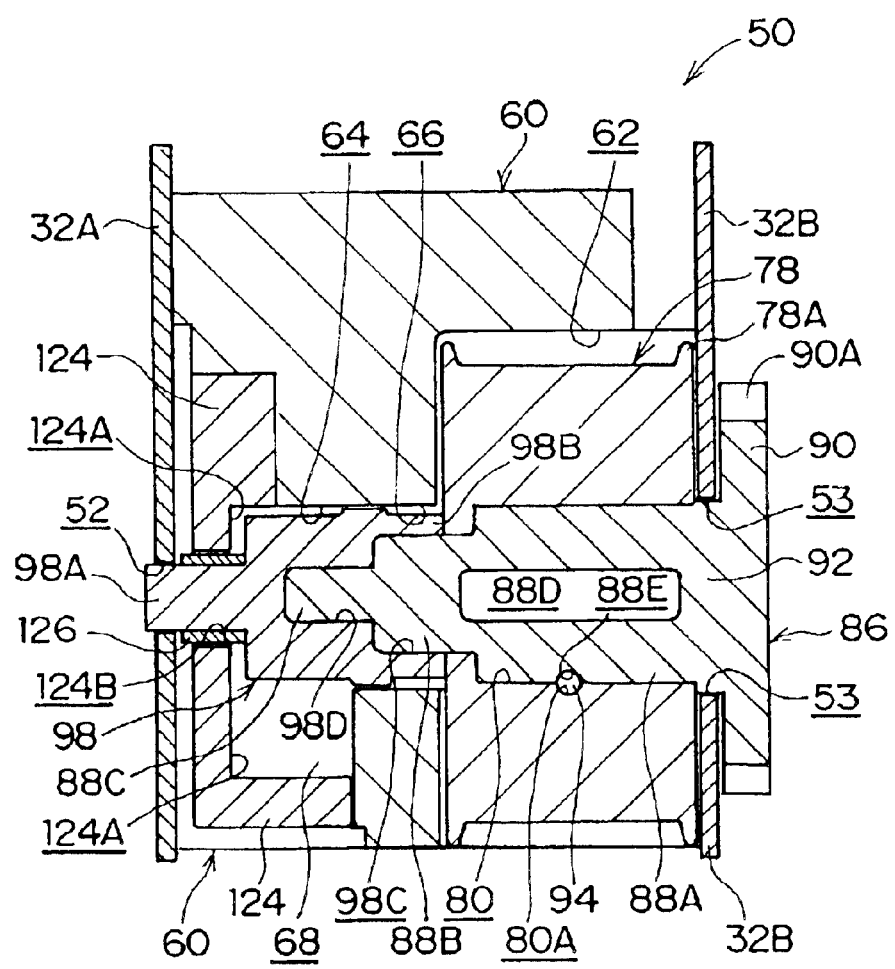
FIG. 7 is a sectional view of a rotating portion forming the lap pretensioner device relating to the embodiment of the present invention.

As shown in FIG. 7, the cover plate 124 is fixed to the base cartridge 60 by, for example, screws, so as to cover the pinion 98 and the rack path portion 68 disposed within the pinion accommodating portion 64, i.e., so as to form the pinion accommodating portion 64 and the rack path portion 68 of the base cartridge 60 and spaces for the rotation and movement of the pinion 98 and the rack 108.

In this state, the supporting shaft 98A of the pinion 98 is inserted so as to be slidable with respect to the bush 126, through the through hole 124B of the cover plate 124. The supporting shaft 98A of the pinion is inserted through the cover plate 124, and as described above, is shaft-supported at the pinion shaft hole 52 of the frame 32.

In this way, the base cartridge 60, in which the spool 78 is accommodated and in which the pinion 98, the rack 108, the gas generator 112 and the like forming the driving device are assembled, is disposed at the leg pieces 32A, 32B of the frame 32, and is fixed to the frame 32 by, for example, screws. In this state, the gear portion 90 of the gear member 86, the pawl 100 (the head portion of the pawl supporting shaft 102), and the return spring 106 are disposed at the outer side in the widthwise direction of the frame 32.

Further, the narrow width webbing 20, which has been passed through the pull-out hole 58 provided at the back piece 32 of the frame 32, is, as described above, trained around the slip joint 22 and folded back, and is sewed to the end portion of the webbing 12 for restraining a vehicle occupant. The narrow width webbing 20 is usually weakly tensed due to rotation of the spool 78 in the direction of arrow B being restricted and due to the webbing 12 being taken-up onto the take-up shaft 14A by the urging force of the power spring of the retractor 14.

Next, operation of the present embodiment will be described.

In the seat belt device 10 having the above-described structure, when a vehicle occupant P (FIG. 4) sits down in the vehicle seat 26, he/she anchors the tongue plate 24 with the buckle device 28 while pulling the tongue plate 24 and pulling the webbing 12 out from the retractor 14. In this state, the shoulder webbing 12A of the webbing 12, which is from the through-anchor 18 to the tongue plate 24 (the buckle device 28), restrains the upper body of the vehicle occupant P, whereas the lap webbing 12B of the webbing 12, which is from the tongue plate 24 to the narrow width webbing 20 (the lap pretensioner device 50), restrains the waist portion of the vehicle occupant P.

At this time, at the lap pretensioner device 50, rotation in the direction of arrow B is restricted by the pawl 100 biting into the gear portion 90 (the pawl 100 and the gear portion 90 form the restricting device), and the webbing 12 for restraining a vehicle occupant and the narrow width webbing 20 are weakly tensed by the power spring of the retractor 14. In this way, the vehicle occupant P is in a state in which the webbing 12 is properly applied to him or her, and the vehicle occupant P travels in the vehicle in this state.

When the acceleration sensor senses a rapid deceleration of the vehicle such as at the time of a collision for example, the control device operates the respective ignition devices of the gas generators 40, 112. At the gas generators 40, 112, the ignition devices ignite the gas generating agents, and the gas generating agents burn and generate large amounts of gas.

In the shoulder pretensioner mechanism of the retractor 14 which forms the shoulder/lap pretensioner integrated-type retractor 30, due to the gas pressure of the gas generated by the gas generator 40, the take-up shaft 14A takes-up the webbing 12 by a predetermined amount while the take-up shaft 14A is rotated in the direction of taking up the webbing 12. In this way, mainly the shoulder webbing 12A is tensed in the direction of restraining the vehicle occupant, and the amount of movement of the upper body of the vehicle occupant P is reduced.

Simultaneously, in the lap pretensioner device 50 forming the shoulder/lap pretensioner integrated-type retractor 30, the gas generated by the gas generator 112 is supplied to the cylinder hole 70 of the base cartridge 60. The piston 110 is thereby slid in the direction of arrow D, and the rack 108, which is integral with the piston 110, rotates the pinion 98 in the direction of arrow A.

The spool 78, which is connected to the pinion 98 so as to be integrally rotatable therewith, rotates together with the pinion 98 by the aforementioned predetermined amount in the direction of arrow A, and while doing so, takes-up the narrow width webbing 20 by a predetermined amount. In this way, mainly the lap webbing 12B is tensed in the direction of restraining the vehicle occupant, and the amount of movement of the waist portion of the vehicle occupant P is reduced.

In this way, at the time the vehicle rapidly decelerates, the webbing 12 for restraining a vehicle occupant is tensed from the both end portions thereof and appropriately limits movement of the vehicle occupant P such that the vehicle occupant P is appropriately protected (the ability to restrain the vehicle occupant is good).

When operation of the shoulder pretensioner mechanism and the lap pretensioner device 50 is completed, the force limiter mechanism (energy absorbing mechanism) of the retractor 14 operates such that energy is absorbed while pulling-out of the webbing 12 for restraining a vehicle occupant is permitted. At this time, at the lap pretensioner device 50, because rotation of the spool 78 in the direction of arrow B is restricted, the narrow width webbing 20 is not pulled-out.

Here, because the lap pretensioner device 50 tenses the webbing 12 for restraining a vehicle occupant by taking-up the narrow width webbing 20, the longitudinal dimension of the lap pretensioner device 50 can be made short as compared with a structure in which a wire connected to a piston is rectilinearly pulled-in as in the conventional art. Further, because the narrow width webbing 20 has a narrower width than the webbing 12 for restraining a vehicle occupant, the widthwise dimension can be prevented from becoming large, and the lap pretensioner device 50 can be made more compact on the whole.

Further, the lap pretensioner device 50 is integrally assembled with the retractor 14 so as to form the shoulder/lap pretensioner integrated-type retractor 30, and is mounted to the lower portion of the center pillar 16 of the vehicle. Thus, the mountability of the lap pretensioner device 50 to the vehicle is improved, and the lap pretensioner device 50 has few effects on the body structure of the vehicle.

In this way, the lap pretensioner device 50 relating to the present embodiment is compact and has improved mountability to a vehicle. Moreover, the space required for mounting the seat belt device 10 provided with the lap pretensioner device 50 (the shoulder/lap pretensioner integrated-type retractor 30) to a vehicle can be reduced while the ability of the seat belt device 10 to restrain the vehicle occupant is maintained.

The spool 78 is accommodated (disposed) in the spool accommodating portion 62 which is provided further toward one side than the central portion in the widthwise direction of the base cartridge 60. Further, the respective parts and portions forming the driving device (including the pinion 98, the rack 108, the piston 110, the cylinder hole 70, the gas generator mounting hole 72, and the gas generator 112) are assembled into the base cartridge at the side opposite the spool 78 (at one side in the axial direction of the spool 78). As a result, the lap pretensioner device 50 can be made to be more compact on the whole.

In particular, the diameter of the spool 78 is large, and the spool 78 can take-up the narrow width webbing 20 by a predetermined amount (a designed amount) by substantially ⅔ of a rotation. Therefore, the stroke of the rack 108 (the piston 100) is short. Thus, the relative dimensions of the driving device with respect to the spool 78 can be optimized, and the lap pretensioner device 50 can be made more compact on the whole.

In particular, the cylinder hole 70 and the gas generator mounting hole 72 are disposed so as to communicate with one another with the central lines in the axial directions thereof being positioned in a plane which is orthogonal to the axial direction of the spool 78. Therefore, the widthwise direction dimension of the driving device (the spool axial direction dimension of the driving device) is small. Namely, the lap pretensioner device 50 can be made to be even more compact on the whole. Moreover, because the cylinder hole 70 and the gas generator mounting hole 72 are disposed in directions intersecting one another, the longitudinal dimension of the driving device can be made compact which is even more preferable.

Because the cylinder hole 70 and the gas generator mounting hole 72 are formed in the base cartridge 60, the number of parts can be reduced. In this way, the assemblability of the lap pretensioner device 50 is improved, and costs can be reduced.

Figure 12:
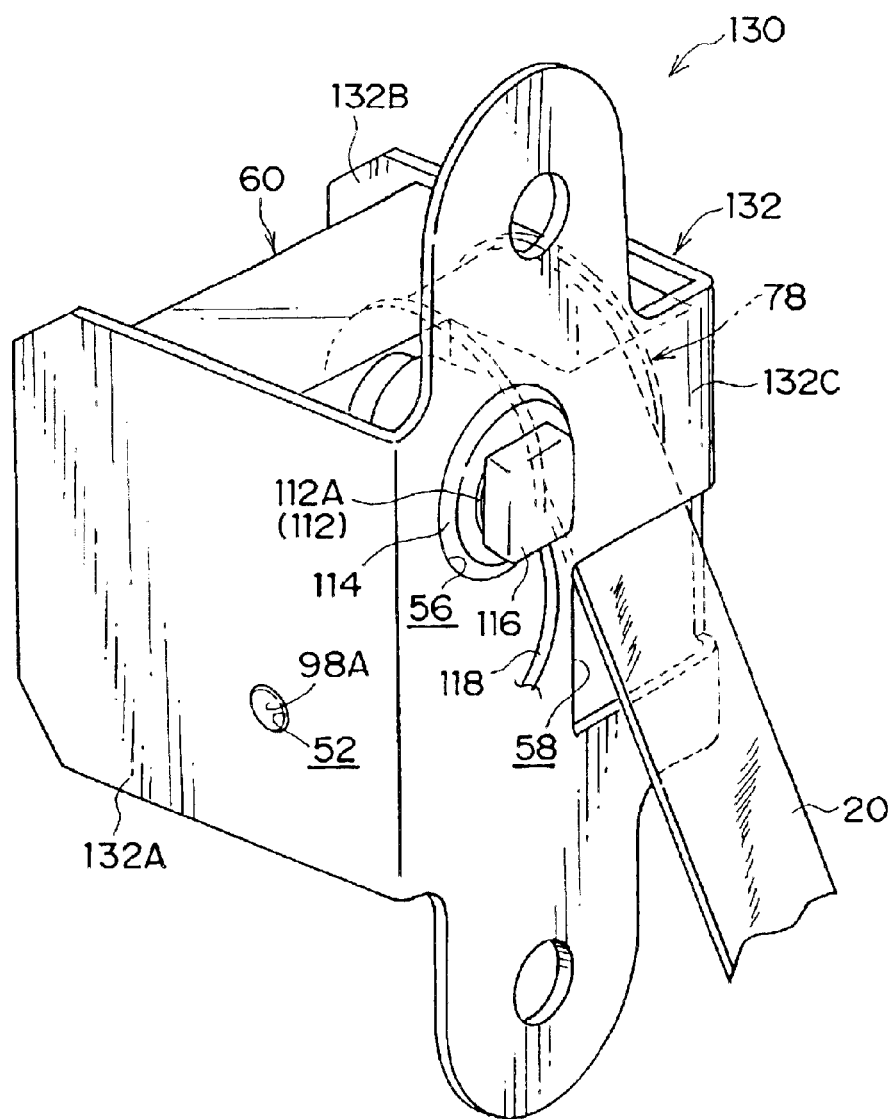
FIG. 12 is a perspective view showing the overall structure of a lap pretensioner device relating to a modified example of the embodiment of the present invention.
Figure 13:
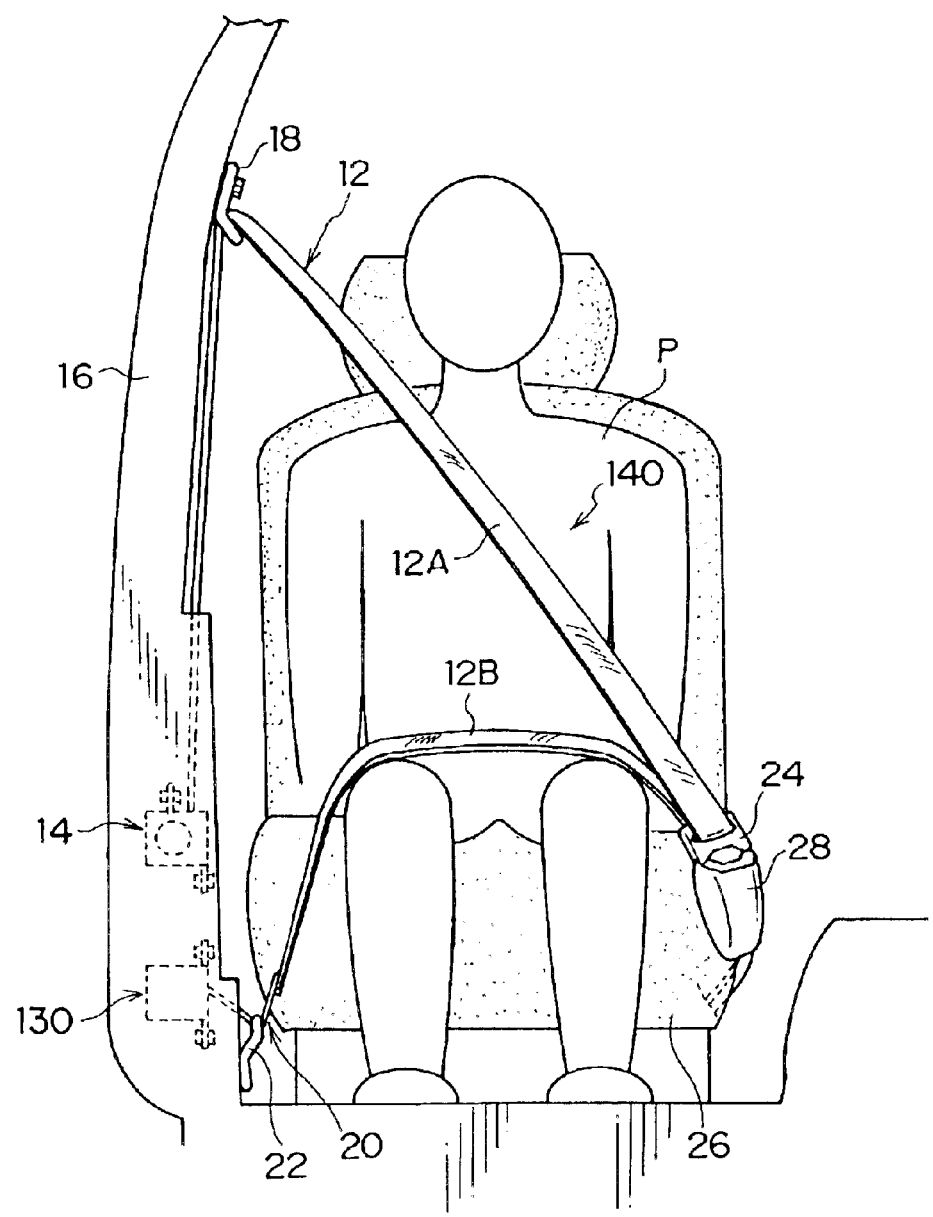
FIG. 13 is a schematic front view showing the overall structure of a seat belt device equipped with the lap pretensioner device relating to the modified example of the embodiment of the present invention.
Figure 14:
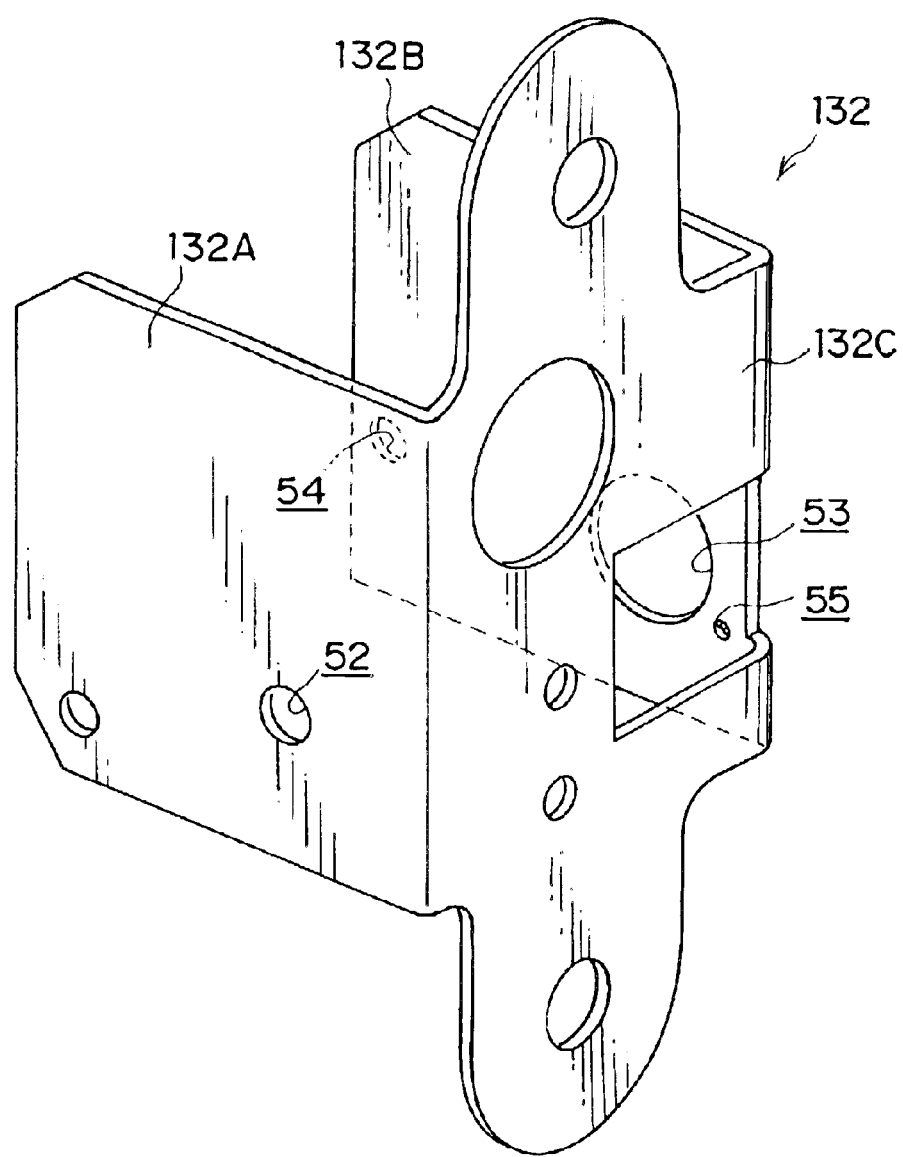
FIG. 14 is a perspective view of a frame forming the lap pretensioner device relating to the modified example of the embodiment of the present invention.

In the above-described embodiment, the seat belt device 10 has a preferable structure equipped with the shoulder/lap pretensioner integrated-type retractor 30 in which the lap pretensioner device 50 and the retractor 14 are integrally assembled. However, the present invention is not limited to the same, and may have a structure relating to a modified example as shown in FIGS. 12 through 14 for example. This modified example will be described hereinafter. Parts and portions which are basically the same as those of the above-described embodiment are denoted by the same reference numerals as in the above-described embodiment, and description thereof will be omitted.

FIG. 12 shows, in perspective view, a lap pretensioner device 130 which is formed independently from the retractor 14. FIG. 13 shows, in a schematic front view, a seat belt device 140 equipped with the lap pretensioner device 130. The lap pretensioner device 130 is formed by assembling the respective structural elements shown in the exploded perspective view of FIG. 3 into a frame 132 shown in FIG. 14.

The frame 132 has a pair of leg pieces 132A, 132B which oppose one another, and a back piece 132C connected to the leg pieces 132A, 132B, and is formed in a substantial U shape as seen in plan view. The back piece 132C extends upward and downward, and the upper and lower end portions thereof are fixed to the vehicle body by bolts.

The frame 132 has the pinion shaft hole 52 formed in the leg piece 132A, the gear shaft hole 53, the pawl shaft hole 54 and the spring receiving hole 55 formed in the leg piece 132B, and the wiring hole 56 and the pull-out hole 58 formed in the back piece 132C. The pull-out hole 58 is offset toward the leg piece 132B, and is formed by cutting out a portion of the leg piece 132B as well.

The lap pretensioner device 130 is formed by assembling the respective structural parts shown in FIG. 3 into the frame 132 in exactly the same way as the above-described lap pretensioner device 50. This structure is often applied to cases of assembly into a vehicle in which, for example, it is not possible to ensure space for mounting the shoulder/lap pretensioner integrated-type retractor 30 to the lower portion of the center pillar 16.

In accordance with the lap pretensioner device 130 having this structure, and the seat belt device 140 equipped with the lap pretensioner device 130, the same effects as those of the lap pretensioner device 50 (the shoulder/lap pretensioner integrated-type retractor 30) and the seat belt device 10 relating to the previously-described embodiment are obtained. However, the effects obtained by integrally assembling the retractor 14 and the lap pretensioner device 50 are not obtained in the present embodiment.

In the above-described embodiments, the lap pretensioner device 50 (the shoulder/lap pretensioner integrated-type retractor 30) and the lap pretensioner device 130 are mounted to the lower portion of the center pillar 16. However, the present invention is not limited to the same. The lap pretensioner devices 50, 130 may be mounted to an appropriate position of the vehicle. Accordingly, for example, in a case in which the present invention is applied to a seat belt device for a rear seat, the lap pretensioner devices 50, 130 may be disposed, for example, at the lower portion of the B pillar.

Further, the above-described embodiments have a preferable structure in which the narrow width webbing 20 is connected to the webbing 12 for restraining a vehicle occupant, and the webbing 12 is directly tensed. However, the present invention is not limited to the same. For example, the pretensioner devices 50, 130 may be structured so as to pull an anchor plate, on which the other end portion of the webbing 12 is anchored, in toward the vehicle body via the narrow width webbing 20.

As described above, the pretensioner device relating to the present invention has the excellent effects that it is compact and the mountability thereof to a vehicle is improved.

Further, the seat belt device relating to the present invention is equipped with the pretensioner device, and has the excellent effect that the space required for mounting the seat belt device to a vehicle is reduced while the ability of the seat belt device to restrain the vehicle occupant is maintained.

What is claimed is:

1. A pretensioner device provided at a first end portion of a webbing having a shoulder webbing portion and a lap webbing portion for restraining a vehicle occupant whose second end portion is anchored to a single retractor having a single take-up shaft that is rotated when one or both of the shoulder or lap webbing portions is freely taken-up and pulled out, the pretensioner device tensing the webbing for restraining a vehicle occupant in a direction of restraining a vehicle occupant at a time of rapid deceleration of a vehicle, the pretensioner device comprising:

a webbing for tensing which is connected to the first end portion of the webbing for restraining a vehicle occupant and whose width is narrower than a width of the webbing for restraining a vehicle occupant;

a spool at which a free end portion of the webbing for tensing is anchored, and which rotates and can take-up the webbing for tensing; and a driving device that positively and forcefully rotates the spool in a direction of taking-up the webbing for tensing at a time of rapid deceleration of the vehicle.

2. The pretensioner device of claim 1, further comprising a base member which is formed in a block shape, and accommodates the spool further toward one side of the base member than a central portion in a widthwise direction of the base member such that a rotational axial direction of the spool and the widthwise direction of the base member coincide, and the driving device is assembled to another side of the base member in the widthwise direction.

3. The pretensioner device of claim 2, wherein the driving device includes a pinion which is provided to be integrally rotatable with the spool, a cylinder whose longitudinal direction is provided parallel to a predetermined radial direction of the pinion, a piston slidably accommodated in the cylinder, a rack which is provided at the piston and which, when the piston slides in the cylinder, rotates the pinion in a direction of taking-up the webbing for tensing while meshing with the pinion, and a gas supplying device communicating with the cylinder and supplying gas to the cylinder at a time of rapid deceleration of the vehicle so as to make the piston slide, and the cylinder, and a mounting hole which communicates with the cylinder and which is for mounting the gas supplying device, are formed in the base member such that central lines in axial directions of the cylinder and the mounting hole are positioned in a plane which is orthogonal to an axial direction of the spool.

4. The pretensioner device of claim 3, wherein the retractor includes a frame for fixing to the vehicle, and the frame includes a pair of leg pieces which oppose one another, and the pair of leg pieces oppose one another so as to substantially correspond to a width of the webbing for restraining a vehicle occupant, and the base member is mounted such that a widthwise direction of the base member coincides with a direction in which the pair of leg pieces oppose one another.

5. The pretensioner device of claim 2, wherein the retractor includes a frame for fixing to the vehicle, and the frame includes a pair of leg pieces which oppose one another, and the pair of leg pieces oppose one another so as to substantially correspond to a width of the webbing for restraining a vehicle occupant, and the base member is mounted such that widthwise direction of the base member coincides with a direction in which the pair of leg pieces oppose one another.

6. The pretensioner device of claim 5, wherein the base member is a base cartridge, and (a) a spool accommodating portion which accommodates a spool and which extends from a substantially central portion of a width of the base cartridge to an end portion of one of the leg pieces, (b) a pinion accommodating portion which accommodates the pinion and which extends to a side opposite the spool accommodating portion, (c) a connecting hole communicating with the spool accommodating portion and the pinion accommodating portion, and (d) a rack path portion through which the rack passes, and which is inclined with respect to a top-bottom direction of the base cartridge, and which is continuous with the pinion accommodating portion, are formed at the base cartridge.

7. The pretensioner device of claim 6, further comprising an anchor plate which anchors the other end portion of the webbing for restraining a vehicle occupant, and the pretensioner device pulls the anchor plate in toward a vehicle body via the webbing for tensing.

8. The pretensioner device of claim 1, further comprising a frame for fixing to the vehicle wherein a portion or substantially all of the driving device is provided inside the frame.

9. The pretensioner device of claim 1, further comprising a frame for fixing to the vehicle wherein the frame includes a guide for guiding a seat belt and the guide is provided at a back portion of the frame.

10. A seat belt device which is a three-point seat belt device for restraining a vehicle occupant, the seat belt device comprising:

a single retractor having a single take-up shaft which is rotatably supported at a frame fixed to a vehicle body, and at which a first end portion of a webbing having a shoulder webbing portion and a lap webbing portion for restraining a vehicle occupant is anchored such that the single take-up shaft is rotated when one or both of the shoulder and lap webbing portions of the webbing for restraining a vehicle occupant is taken-up or pulled out, and a pretensioner device which rotates the take-up shaft in a webbing take-up direction at a time of rapid deceleration of a vehicle;

wherein the pretensioner device is provided at a second end portion of the webbing for restraining a vehicle occupant whose first end portion is anchored to the retractor so as to be freely taken-up and pulled-out, the pretensioner device tensing the webbing for restraining a vehicle occupant in a direction of restraining a vehicle occupant at a time of rapid deceleration of the vehicle, the pretensioner device including:

a webbing for tensing which is connected to the other end portion of the webbing for restraining a vehicle occupant and whose width is narrower than a width of the webbing for restraining a vehicle occupant;

a spool at which a free end portion of the webbing for tensing is anchored, and which rotates and can take-up the webbing for tensing; and a driving device that positively and forcefully rotates the spool in a direction of taking-up the webbing for tensing at a time of rapid deceleration of the vehicle.

11. The seat belt device of claim 10, wherein the pretensioner device further include a base member, and the base member is formed in a block shape and accommodates the spool further toward one side of the base member than a central portion in a widthwise direction of the base member such that a rotational axial direction of the spool and the widthwise direction of the base member coincide, and the driving device is assembled to another side of the base member in the widthwise direction.

12. The seat belt device of claim 11, wherein the driving device includes a pinion which is provided to be integrally rotatable with the spool, a cylinder whose longitudinal direction is provided parallel to a predetermined radial direction of the pinion, a piston slidably accommodated in the cylinder a rack which is provided at the piston and which, when the piston slides in the cylinder, rotates the pinion in a direction of taking-up the webbing for tensing while meshing with the pinion, and a gas supplying device communicating with the cylinder and supplying gas to the cylinder at a time of rapid deceleration of the vehicle so as to make the piston slide, and the cylinder, and a mounting hole which communicates with the cylinder and which is for mounting the gas supplying device, are formed in the based member such that central lines in axial directions of the cylinder and the mounting hole are positioned in a plane which is orthogonal to an axial direction of the spool.

13. The seat belt device of claim 12, wherein the base member is mounted between a pair of leg pieces which are provided at said frame for fixing the retractor to the vehicle and which oppose one another so as to substantially correspond to a width of the webbing for restraining a vehicle occupant, such that a widthwise direction of the base member coincides with a direction in which the pair of leg pieces oppose one another.

14. The seat belt device of claim 11, wherein the base member is mounted between a pair of leg pieces which are provided at said frame for fixing the retractor to the vehicle and which oppose one another so as to substantially correspond to a width of the webbing for restraining a vehicle occupant, such that a widthwise direction of the base member coincides with a direction in which the pair of leg pieces oppose each another.

15. The seat belt device of claim 14, wherein the base member is a base cartridge, and (a) a spool accommodating portion which accommodates a spool and which extends from a substantially central portion of a width of the base cartridge to an end portion of one of the leg pieces, (b) a pinion accommodating portion which accommodates the pinion and which extends to a side opposite the spool accommodating portion, (c) a connecting hole communicating with the spool accommodating portion and the pinion accommodating portion, and (d) a rack path portion through which the rack passes, and which is inclined with respect to a top-bottom direction of the base cartridge, and which continuous with the pinion accommodating portion, are formed at the base cartridge.

16. The seat belt device of claim 15, further comprising an anchor plate which anchors the other end portion of the webbing for restraining a vehicle occupant, and the seat belt device pulls the anchor plate in toward a vehicle body via the webbing for tensing.

17. The seat device of claim 10, wherein the pretensioner device is provided inside the frame and a portion or substantially all of the driving device is provided outside the frame.

18. The seat belt device of claim 10, wherein the frame includes a first webbing guide of the retractor and a second webbing guide of the pretensioner device, the first webbing guide is provided at an upper part of the frame, and the second webbing guide is provided at a back portion of the frame.

* * * * *